United States Patent  (10) Patent No.: US 12,130,186 B2
Liang et al.  (45) Date of Patent: Oct. 29, 2024

(54) METHOD AND SYSTEM FOR REAL-TIME WIDE-FIELD DYNAMIC TEMPERATURE SENSING

(71) Applicant: INSTITUT NATIONAL DE LA RECHERCHE SCIENTIFIQUE, Québec (CA)

(72) Inventors: Jinyang Liang, Boucherville (CA); Xianglei Liu, Longueuil (CA); Artiom Skripka, Berkeley, CA (US); Fiorenzo Vetrone, Montréal (CA); Yingming Lai, Longueuil (CA); Miao Liu, Longueuil (CA)

(73) Assignee: INSTITUT NATIONAL DE LA RECHERCHE SCIENTIFIQUE, Quebec (CA)

( * ) Notice: Subject to any disclaimer, the term of this patent is extended or adjusted under 35 U.S.C. 154(b) by 107 days.

(21) Appl. No.: 17/893,784

(22) Filed: Aug. 23, 2022

(65) Prior Publication Data

US 2023/0071896 A1 Mar. 9, 2023

Related U.S. Application Data

(60) Provisional application No. 63/260,511, filed on Aug. 23, 2021.

(51) Int. Cl.
*H04N 23/56* (2023.01)
*G01J 5/10* (2006.01)
(Continued)

(52) U.S. Cl.
CPC . *G01J 5/48* (2013.01); *G01J 5/10* (2013.01); *G01J 5/80* (2022.01); *G02B 26/105* (2013.01);
(Continued)

(58) Field of Classification Search
CPC ...... G01J 5/48; G01J 5/80; G01J 5/10; H04N 23/56; H04N 23/951; G02B 26/105; G02B 27/14
(Continued)

(56) References Cited

U.S. PATENT DOCUMENTS 5,705,821 A 1/1998 Barton et al.
2005/0169348 A1* 8/2005 Chen .................. G01K 11/20
374/161

FOREIGN PATENT DOCUMENTS

WO 2021102580 A1 6/2021

OTHER PUBLICATIONS

S W Allison et al., Nanoscale thermometry via the fluorescence of YAG:Ce phosphor particles: measurements from 7 to 77° C, Nanotechnology 14 (2003) 859-863.
(Continued)

*Primary Examiner* — Nguyen T Truong

(57) ABSTRACT

A method and a system method for real-time wide-field dynamic temperature sensing of an object, the method comprising producing wide-field illumination to upconverting nanoparticles at the object plane, collecting a light emitted by the upconverting nanoparticles, dividing a collected light into a reflected component and a transmitted component, imaging the reflected component into a first image, imaging the transmitted component into a second image; processing the images; and reconstruction of the object from resulting proceed images.

18 Claims, 25 Drawing Sheets

(51) Int. Cl.
G01J 5/48 (2022.01)
G01J 5/80 (2022.01)
G02B 26/10 (2006.01)
G02B 27/14 (2006.01)
H04N 23/951 (2023.01)
G01J 5/00 (2022.01)

(52) U.S. Cl.
CPC ............ *G02B 27/14* (2013.01); *H04N 23/56* (2023.01); *H04N 23/951* (2023.01); *G01J 2005/0077* (2013.01)

(58) Field of Classification Search
USPC ........................................................ 348/168
See application file for complete search history.

(56) References Cited

OTHER PUBLICATIONS

F. Auzel, Upconversion and Anti-Stokes Processes with f and d Ions in Solids, Chem. Rev. 2004, 104, 139-173.
T.T. Basiev et al., Multiphonon Relaxation of the Energy of Electronic Excitation in Optical Crystals Doped with Rare-Earth Ions, Laser Physics, vol. 7, No. 6, 1997, pp. 1139-1152.
W. Becker, lifetime imaging—techniques and applications, Journal of Microscopy, vol. 247, Pt 2 2012, pp. 119-136.
R K.P. Benninger et al., Quantitative 3D Mapping of Fluidic Temperatures within Microchannel Networks Using Fluorescence Lifetime Imaging, Anal. Chem. 2006, 78, 2272-2278.
P.Bolek et al., Ga-modified YAG:Pr3+ dual-mode tunable luminescence thermometers, Chemical Engineering Journal 421 (2021) 129764.
C D.S. Brites et al., Thermometry at the nanoscale, Nanoscale, 2012, 4, 4799.
S H. Chan et al., Plug-and-Play ADMM for Image Restoration: Fixed Point Convergence and Applications, arXiv:1605.01710v2 [cs.CV] Nov. 11, 2016.
P S. Chelushkin, Phosphorescence Lifetime Imaging (PLIM): State of the Art and Perspectives, Progress in Photon Science, Springer Series in Chemical Physics 119-2019.
Z Chen et al., Phosphorescent Polymeric Thermometers for In Vitro and In Vivo Temperature Sensing with Minimized Background Interference, Adv. Funct. Mater. 2016, 26, 4386-4396.
P. R. N. Childs et al., Review of temperature measurement, Review of Scientific Instruments vol. 71. No. 8 Aug. 2000.
P.V. Dos Santos et al., Optical temperature sensing using upconversion Fluorescence emission in Er31 /Yb31—codoped chalcogenide glass, Applied Physics Letters vol. 73, No. 5 Aug. 3, 1998.
R Datta et al., Fluorescence lifetime imaging microscopy: fundamentals and advances in instrumentation, analysis, and applications, J. Biomed. Opt. 25(7), 071203 (2020).
R. Franke et al., Frequency-domain fluorescence lifetime imaging system (pco.flim) based on a in-pixel dual tap control CMOS image sensor, SPIE BiOS, 2015.
L.Gao et al., Single-cell photoacoustic thermometry, Journal of Biomedical Optics 18(2), 026003 (Feb. 2013).
E.M. Graham et al., Quantitative mapping of aqueous microfluidic temperature with sub-degree resolution using fluorescence lifetime imaging microscopy†, Lab Chip, 2010, 10, 1267-1273.
H.Gao et al., A simple yet effective AIE-based fluorescent nanothermometer for temperature mapping in living cells using fluorescence lifetime imaging microscopyt, Nanoscale Horiz., 2020, 5, 488.
L.M. Hirvonen et al., Photon counting phosphorescence lifetime imaging with TimepixCam, Review of Scientific Instruments 88, 013104 (2017).
S. Howard et al., Frequency-multiplexed in vivo multiphoton phosphorescence lifetime microscopy, Nature Photonics | vol. 7 | Jan. 2013.

N Inada et al., Temperature imaging using a cationic linear fluorescent polymeric thermometer and fluorescence lifetime imaging microscopy, Nature Protocols | vol. 14 | Apr. 2019 | 1293-1321.
S L Jacques, Corrigendum: Optical properties of biological tissues: a review, Phys. Med. Biol. 58 (2013) 5007-5008.
D. Jaque et al., Luminescence nanothermometry†, Nanoscale, 2012, 4, 4301.
H S Jung et al., Organic molecule-based photothermal agents: an expanding photothermal therapy universe, Chem. Soc. Rev., 2018, 47, 2280.
H Kurikawa et al., High resolution imaging of intracellular oxygen concentration by phosphorescence lifetime, Scientific Reports | 5:10657 | DOi: 10.1038/srep10657, 2015.
L Labrador-Paez et al., Reliability of rare-earth-doped infrared luminescent nanothermometers, Nanoscale, 2018, 10, 22319.
J Liang et al., Single shot real-time video recording of a photonic Mach cone induced by a scattered light pulse, Sci. Adv. 2017; 3 : e1601814 Jan. 20, 2017.
J Liang et al., Single-shot real-time femtosecond imaging of temporal focusing, Science & Applications (2018) 7:42.
J Liang et al., Single-shot stereo-polarimetric compressed ultrafast photography for light-speed observation of high-dimensional optical transients with picosecond resolution, Nature Communications | (2020) https://doi.org/10.1038/s41467-020-19065-5.
Liang, Punching holes in light: recent progress in single-shot coded-aperture optical imaging, Rep. Prog. Phys. 83 (2020) 116101 (32pp).
Y. Liu et al., Rank Minimization for Snapshot Compressive Imaging, arXiv:1807.07837v1 [cs.CV] Jul. 20, 2018.
X. Liu et al., Single-shot compressed optical-streaking ultra-high-speed photography, vol. 44, No. 6 / Mar. 15, 2019 / Optics Letters.
X. Liu et al., Single-shot real-time sub-nanosecond electron imaging aided by compressed sensing: Analytical modeling and simulation, Micron 117 (2019) 47-54.
K. Maciejewaska et al., NIR luminescence lifetime nanothermometry based on phonon assisted Yb3+-Nd3+ energy transfer, Nanoscale Adv. 2021.
D Obermayer et al., On the importance of simultaneous infrared/fiber-optic temperature monitoring in the microwave-assisted synthesis of ionic liquids, Org. Biomol. Chem., 2010, 8, 114-121.
A. Pickel et al., Apparent self-heating of individual upconverting nanoparticle thermometers, Nature Communications | (2018) 9:4907.
H. Qin et al., Tuning the upconversion photoluminescence lifetimes of NaYF4:Yb3+, Er3+ through lanthanide Gd3+ doping, Scientific Reports | (2018) 8:12683.
I. Rostami et al., Breakthroughs in medicine and bioimaging with up-conversion nanoparticles, International Journal of Nanomedicine 2019:14 7759-7780.
G. Schlegel et al., Fluorescence Decay Time of Single Semiconductor Nanocrystals, Physical Review Letters, vol. 88, No. 13, Apr. 1, 2022.
R. Sen et al., New luminescence lifetime macro-imager based on a Tpx3Cam optical camera, vol. 11, No. 1/ Jan. 1, 2020 / Biomedical Optics Express.
Y. Shen et al., Ag2S Nanoheaters with Multiparameter Sensing for Reliable Thermal Feedback during In Vivo Tumor Therapy, Adv. Funct. Mater. 2020, 30, 2002730.
Y. Shen et al., In Vivo Spectral Distortions of Infrared Luminescent Nanothermometers Compromise Their Reliability, ACS Nano 2020, 14, 4122-4133.
A. Skripka et al., Spectral characterization of LiYbF4 upconverting nanoparticles, Nanoscale, 2020, 12, 17545-17554.
P. Stanley May et al., Tutorial on the acquisition, analysis, and interpretation of upconversion luminescence data, Methods Appl. Fluoresc. 7 (2019) 023001.
K. Suhling et al., Fluorescence lifetime imaging (FLIM): Basic concepts and some recent developments, Medical Photonics (2015) 27, 3-40.
K. Suhling et al., Wide-field TCSPC-based fluorescence lifetime imaging (FLIM) Microscopy, Proc. of SPIE vol. 9858 98580J-1, 2016.
M. Tan et al., Accurate In Vivo Nanothermometry through NIR-II Lanthanide Luminescence Lifetime, Small 2020, 16, 2004118.

(56) References Cited

OTHER PUBLICATIONS

F. Vetrone et al., Temperature Sensing Using Fluorescent Nanothermometers, ACS NANO, vol. 4, No. 6, May 4, 2010.

W. Snyder, Classification-based Emissivity for Land Surface Temperature Measurement from Space, May 24, 2005.

C. Wang et al., Determining intracellular temperature at single-cell level by a novel thermocouple method, Cell Research (2011) 21:1517-1519.

R. Wang et al., Thermomechanical fatigue experiment and failure analysis on a nickel-based superalloy turbine blade, Engineering Failure Analysis 102 (2019) 35-45.

P. Wang et al., Single-shot ultrafast imaging attaining 70 trillion frames per second, Nature Communications | (2020) 11:2091.

M.P. Wood et al., Simultaneous Temperature, Concentration, and Pressure Imaging of Water Vapor in a Turbine Engine, EEE Sensors Journal, vol. 15, No. 1, Jan. 2015.

B. Xiong et al., Luminescence lifetime imaging using a cellphone camera with an electronic rolling shutter, vol. 45, No. 1 / Jan. 1, 2020 / Optics Letters.

X. Yuan et al., Compressive Hyperspectral Imaging With Side Information, IEEE Journal of Selected Topics in Signal Processing, vol. 9, No. 6, Sep. 2015.

X. Yuan et al., Plug-and-Play Algorithms for Large-scale Snapshot Compressive Imaging, arXiv:2003.13654v2 [eess.IV] Jul. 17, 2020.

Z. Zhang et al., Near-Infrared Light-Mediated Nanoplatforms for Cancer Thermo-Chemotherapy and Optical Imaging, Adv. Mater. 2013, 25, 3869-3880.

H. Zhang et al., Dual-Emissive Phosphorescent Polymer Probe for Accurate Temperature Sensing in Living Cells and Zebrafish Using Ratiometric and Phosphorescence Lifetime Imaging Microscopy, ACS Appl. Mater. Interfaces 2018, 10, 1754217550.

J. Zhou et al., Advances and challenges for fluorescence nanothermometry, NAtURe MethoDS | vol. 17 | Oct. 2020 | 967-980.

\* cited by examiner

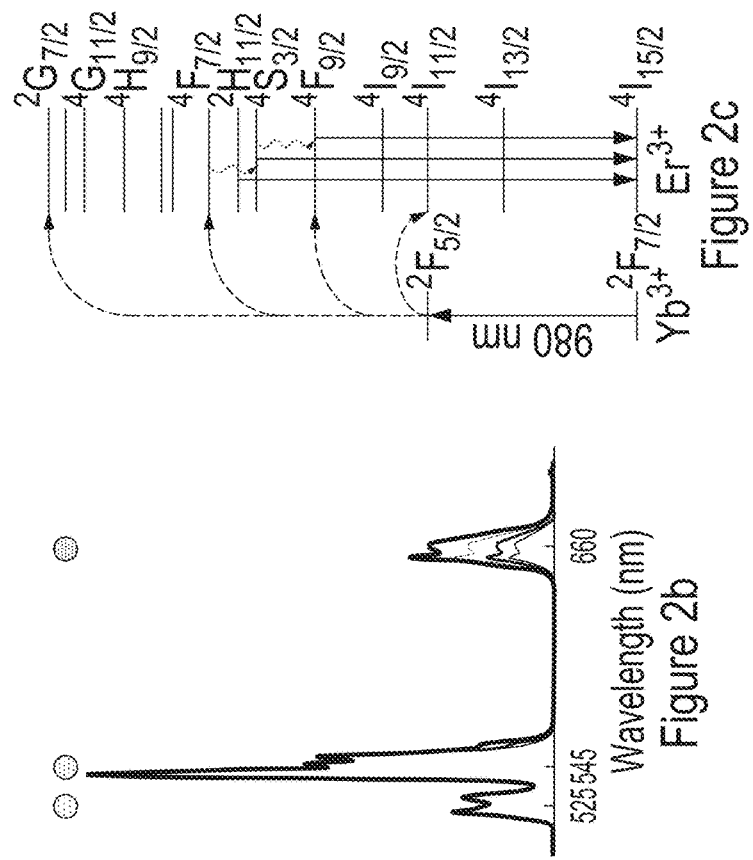
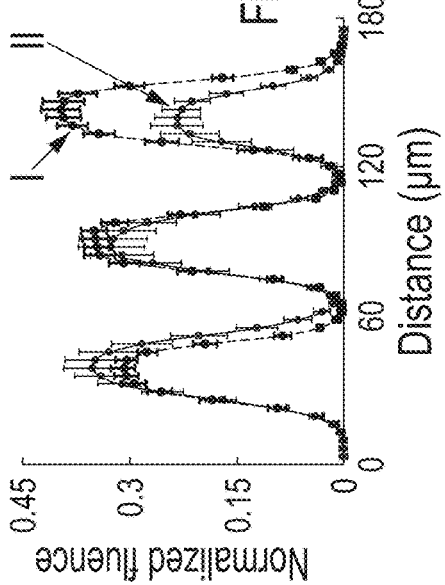
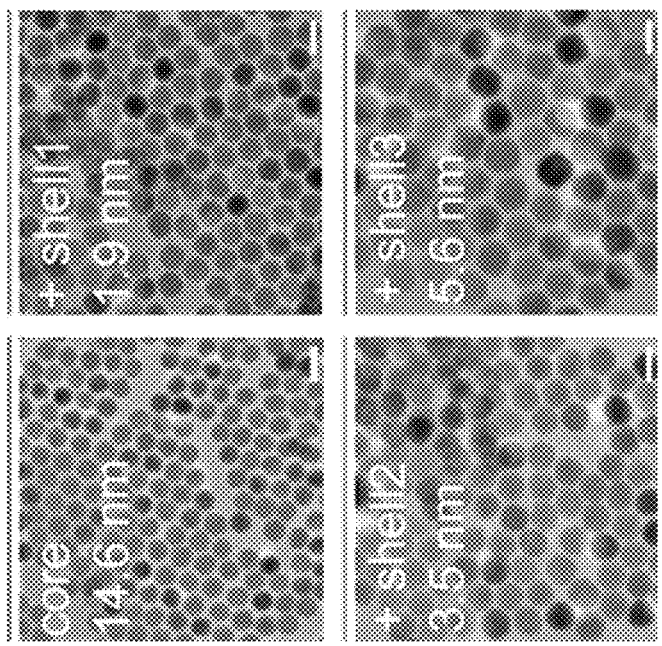
Figure 2a
Figure 2b
Figure 2c
Figure 2d
Figure 2e

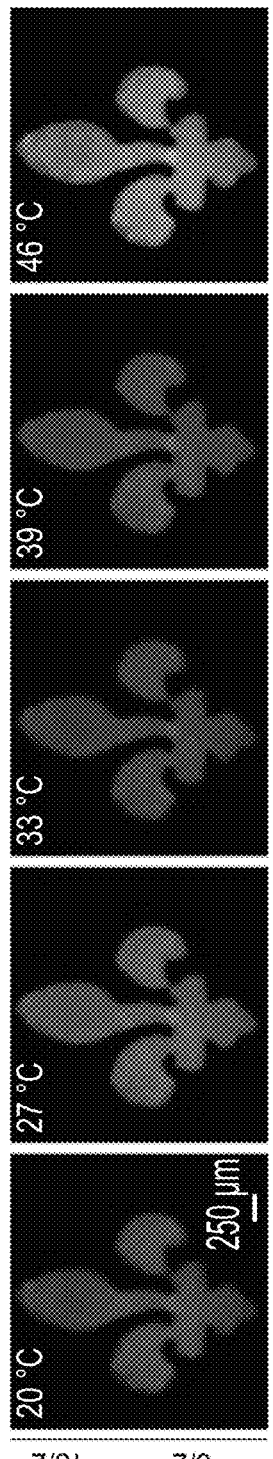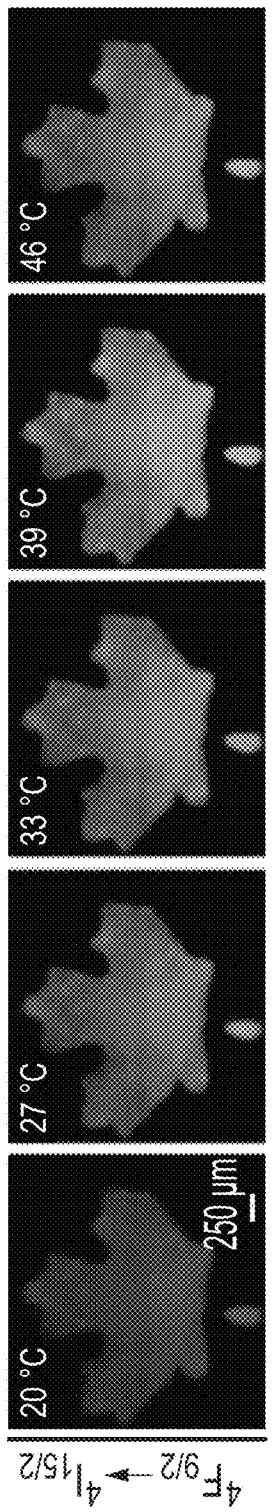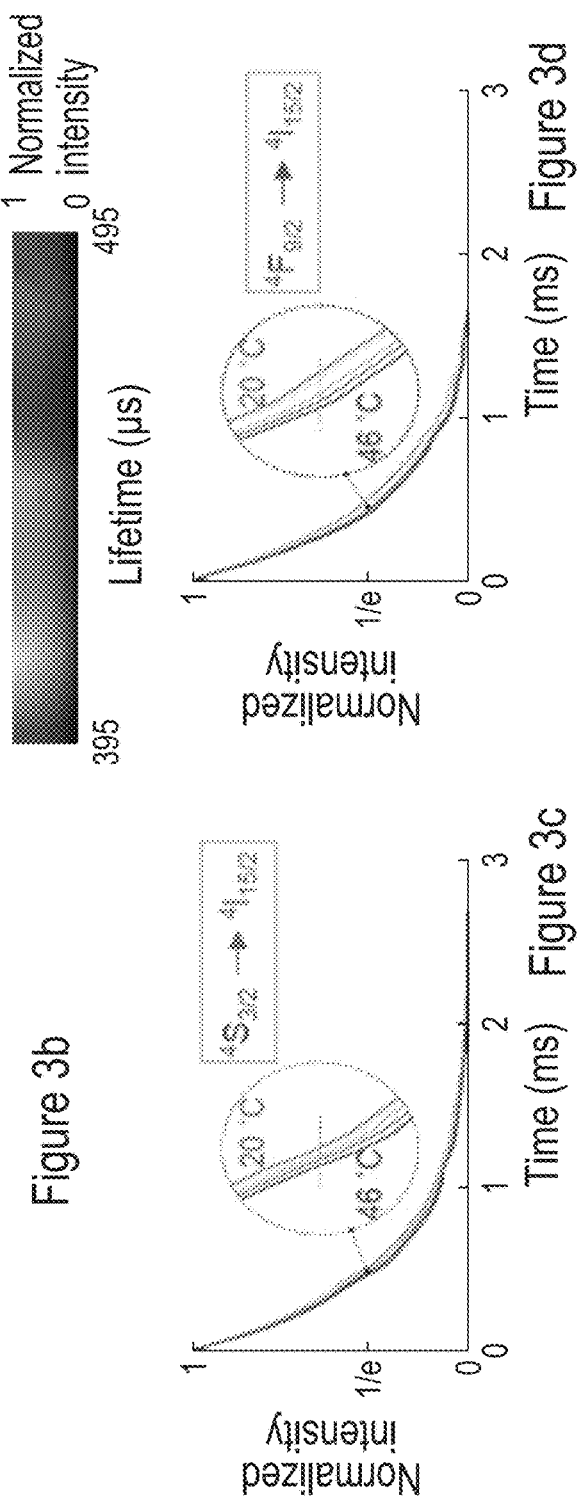

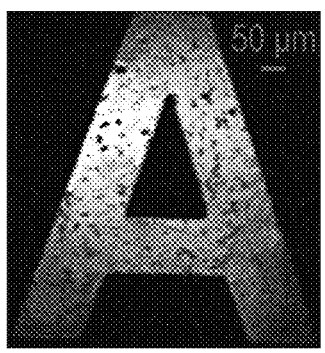  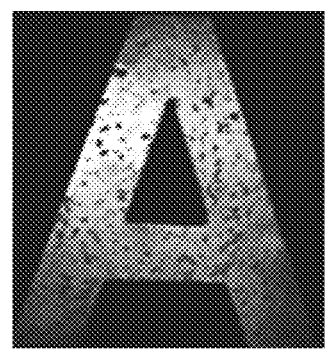
Figure 5a  Figure 5b  Figure 5c
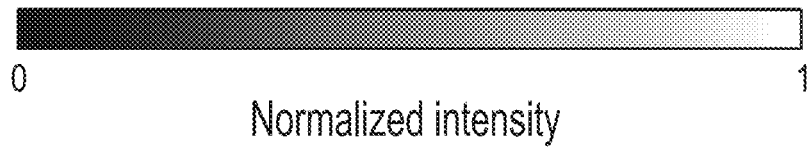

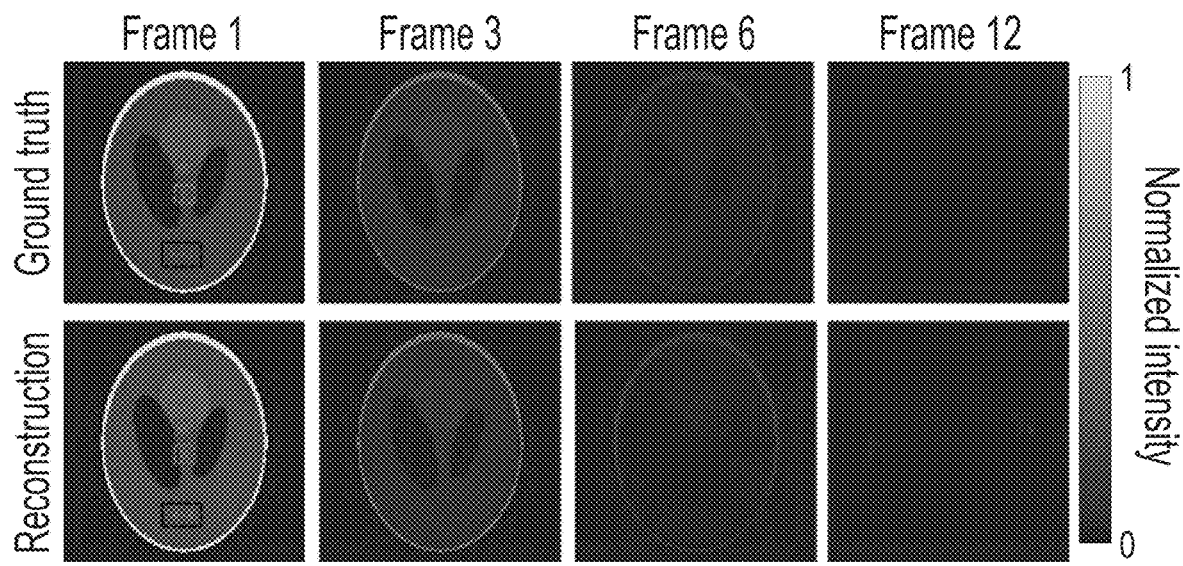
Figure 6a
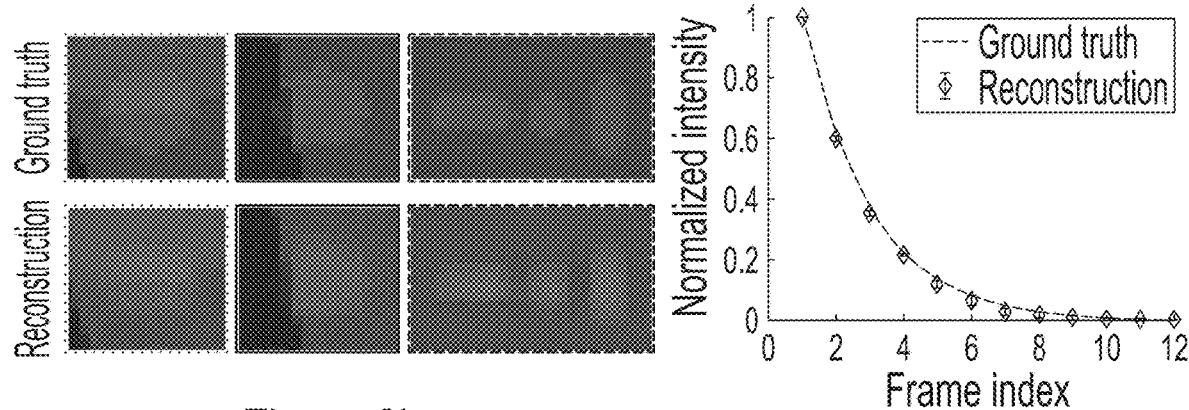
Figure 6b
Figure 6c

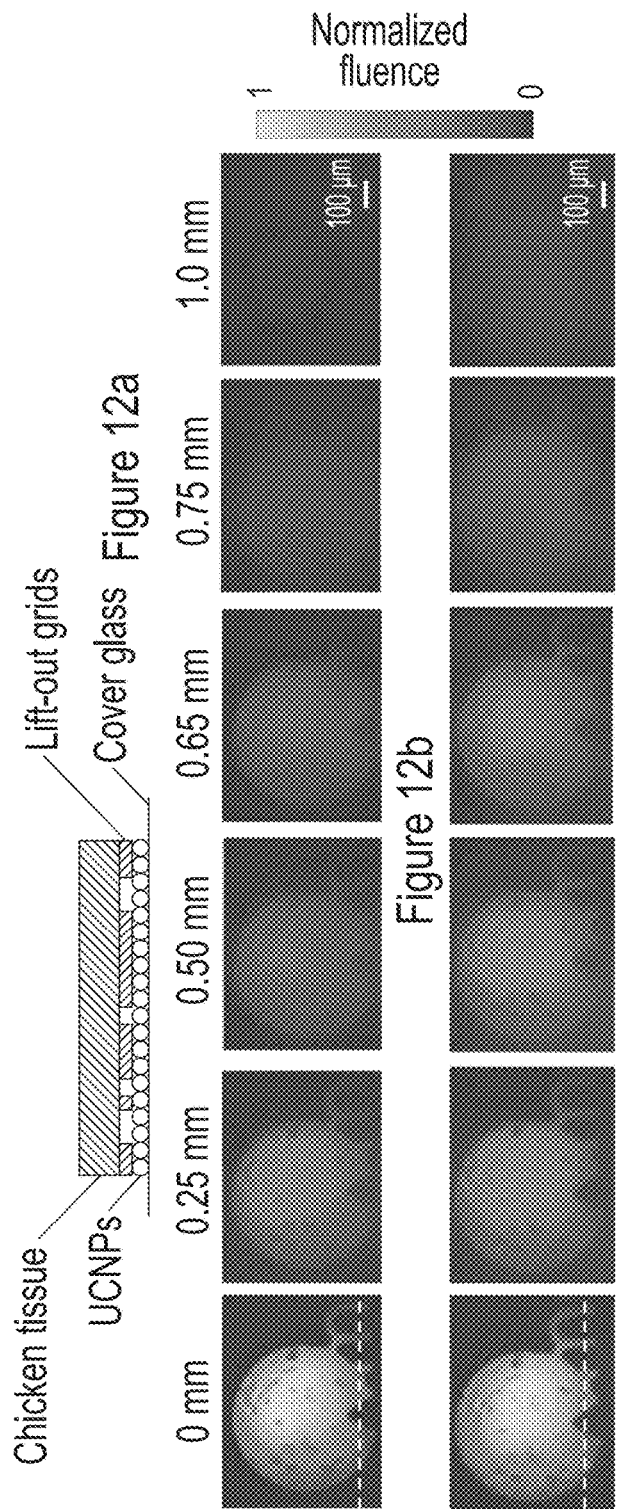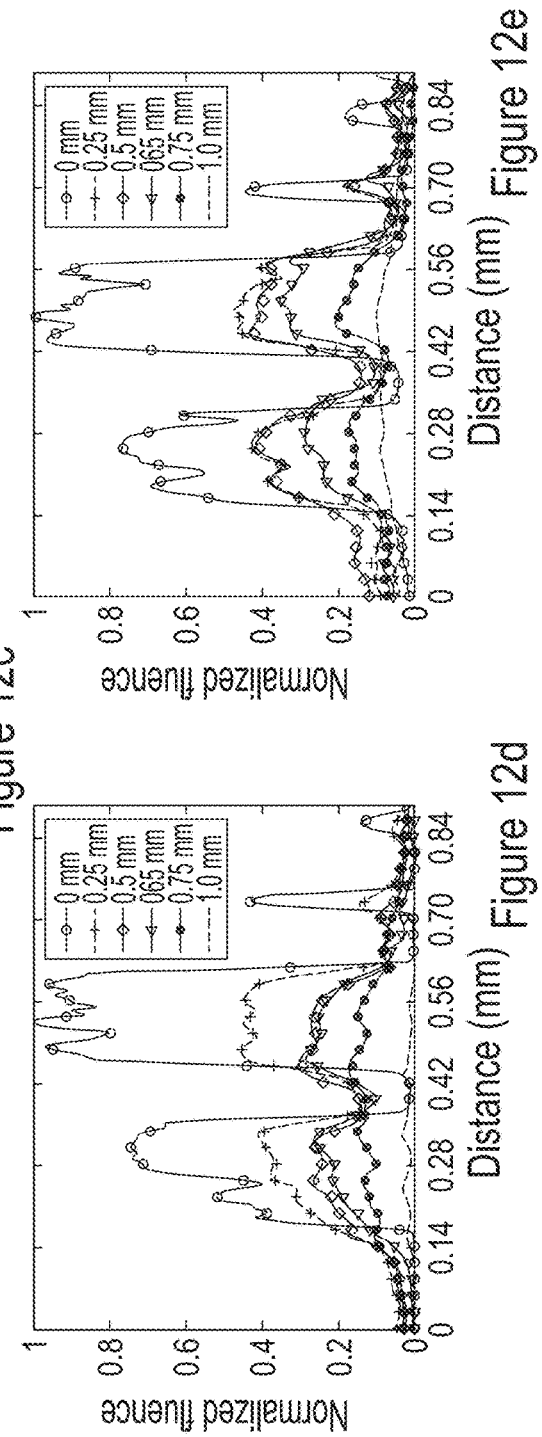

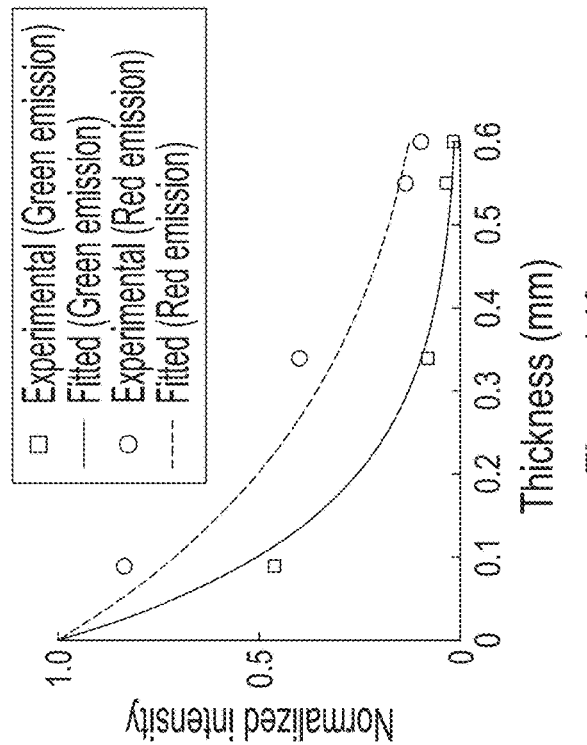
Figure 14d
Figure 14e
Figure 14g
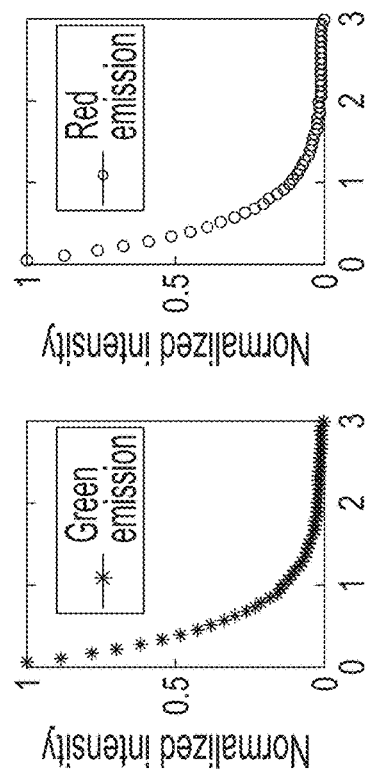
Figure 14f
Figure 14h
Figure 14i

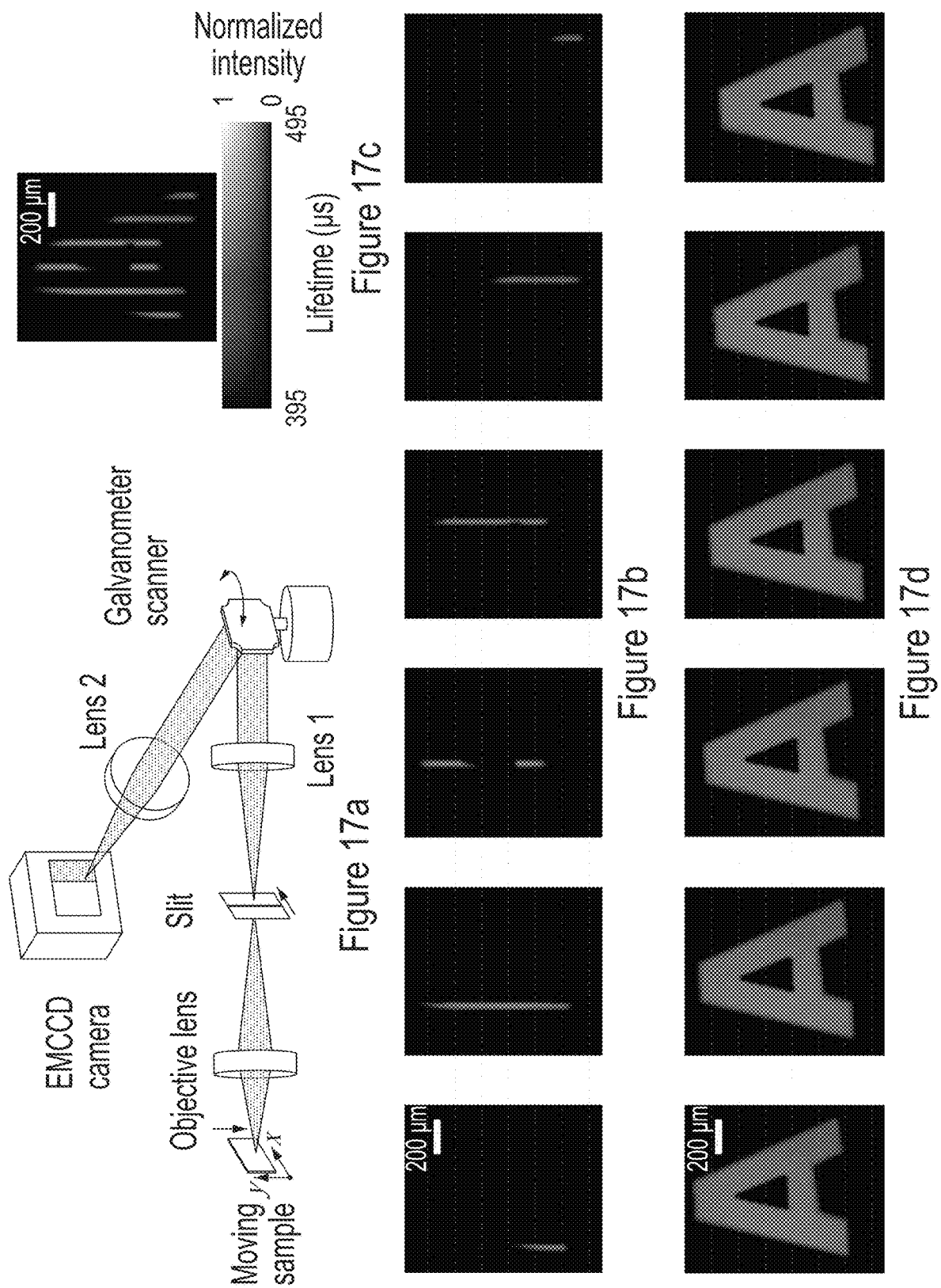

METHOD AND SYSTEM FOR REAL-TIME WIDE-FIELD DYNAMIC TEMPERATURE SENSING

CROSS REFERENCE TO RELATED APPLICATIONS

This application claims benefit of U.S. provisional application Ser. No. 63/260,511, filed on Aug. 23, 2021. All documents above are incorporated herein in their entirety by reference.

FIELD OF THE INVENTION

The present invention relates to temperature sensing. More specifically, the present invention is concerned with a method and system for fast wide-field upconversion luminescence lifetime thermometry.

BACKGROUND OF THE INVENTION

Temperature is an important parameter associated with a number of physical, chemical, and biological processes. Accurate and real-time, temperature sensing at microscopic scales is essential to both industrial applications and scientific research, including the examination of internal strains in turbine blades, control of the synthesis of ionic liquids, and theranostics of cancer.

Phosphorescence lifetime imaging (PLI) has emerged as a promising approach to temperature sensing, due to its high spatial resolution, high temperature sensitivity, and resilience to experimental perturbation. Because phosphorescence can be both excited and detected optically, the resulting non-contact phosphorescence lifetime imaging possesses a high spatial resolution. This advantage not only overcomes the intrinsic limitation in spatial resolution of imaging thermography due to the long wavelengths of thermal radiation but also avoids heat-transfer-induced inaccuracy in conventional contact methods. Moreover, independent of accurate prior knowledge of the physical properties of the sample, in terms of emissivity and Grüneisen coefficient, phosphorescence lifetime imaging brings in higher flexibility in sample selection. Furthermore, phosphorescence lifetime imaging is less susceptible than intensity-based measurements to inhomogeneous signal attenuation, stray light, photobleaching, light path length, and excitation intensity variations. Finally, phosphorescence lifetime imaging does not rely on the concentration of labeling agents, which eliminates the need for special ratiometric probes.

Phosphorescence lifetime imaging (PLI) in temperature mapping depends on temperature indicators and optical imaging instruments.

Recent advances in biochemistry, materials science, and molecular biology have discovered numerous labeling agents for phosphorescence lifetime imaging-based temperature sensing, such as lanthanide-doped upconverting nanoparticles (UCNPs) for example. Leveraging the long-lived excited states provided by the lanthanide ions, upconverting nanoparticles can sequentially absorb two, or more, low-energy near-infrared photons and convert them to one higher-energy photon, in an upconversion process allowing using excitation power densities several orders of magnitude lower than those needed for simultaneous multiphoton absorption. The near-infrared excitation, with smaller extinction coefficients, also gains deeper penetration. Besides, the upconverted luminescence, particularly the Boltzmann-coupled emission bands in co-doped erbium/ytterbium ($Er^{3+}Yb^{3+}$) systems, is highly sensitive to temperature changes. Moreover, long-lived emission, in the range between microseconds and milliseconds, of upconverting nanoparticles circumvents interferences from autofluorescence and scattering during image acquisition, which translates into improved imaging contrast and detection sensitivity. Finally, because of advances in their synthesis and surface functionalization coupled with the innovation of core/shell engineering, upconverting nanoparticles have become much brighter, photostable, biocompatible, and non-toxic. As a result, upconverting nanoparticles are one of the frontrunners in temperature indicators for phosphorescence lifetime imaging.

Advanced optical imaging is the other indispensable constituent in phosphorescence lifetime imaging (PLI)-based temperature mapping. Phosphorescence lifetime imaging (PLI) typically uses scanning time-correlated single-photon counting (TCSPC) to determine phosphorescence decay point by point. To accelerate data acquisition, wide-field methods comprise parallel collection in the time-domain and frequency-domain; In the time-domain, these methods extend time-correlated single-photon counting (TCSPC) to wide-field imaging. Photoluminescence decay over a 2D field of view (FOV) is synthesized from above 100,000 frames. Alternatively, frequency-domain wide-field phosphorescence lifetime imaging methods use phase difference between the intensity-modulated excitation and the received phosphorescence signal to determine the 2D lifetime distribution.

Although allowing high signal-to-noise ratios, scanning operation in time-correlated single-photon counting (TCSPC) leads to an excessively long imaging time to form a two-dimensional (2D) lifetime map because extended pixel dwell time is required to record the long-lived phosphorescence. Wide-field phosphorescence lifetime imaging (PLI) in the time domain require the phosphorescence emission to be precisely repeatable, which is not practical in real measurement. In frequency-domain wide-field phosphorescence lifetime imaging, limited by the range of frequency synthesizers, the measurable lifetimes are mostly restricted to below 100 µs, which is shorter than the lifetimes of most upconverting nanoparticles (UCNPs). Akin to the time-domain systems, frequency-domain systems rely on the integration over many periods of modulation intensity, during which the samples must remain stationary. Thus far, existing phosphorescence lifetime imaging methods fall short in high-resolution 2D temperature sensing of moving samples.

Despite remarkable advances in luminescent temperature indicators, optical instruments still lack the ability of wide-field phosphorescence lifetime imaging in real time, thus falling short in dynamics temperature mapping.

There is still a need in the art for a system and a method for imaging thermometry for real-time wide-field dynamic temperature sensing.

SUMMARY OF THE INVENTION

More specifically, in accordance with the present invention, there is provided a method for real-time wide-field dynamic temperature sensing of an object, comprising producing wide-field illumination to upconverting nanoparticles at the object plane, collecting a light emitted by the upconverting nanoparticles, dividing a collected light into a reflected component and a transmitted component; imaging the reflected component into a first image, imaging the transmitted component into a second image; processing the images; and reconstruction of the object from resulting proceed images.

There is further provided a system for real-time wide-field dynamic temperature sensing of an object, comprising an illumination unit configured to produce wide-field illumination to upconverting nanoparticles at the object plane; an objective collecting light emitted by the upconverting nanoparticles; a beam splitter dividing a collected light into a reflected component and a transmitted component; a spatiotemporal integrator imaging the reflected component into a first image; a spatial encoder encoding the object into spatially encoded frames, a rotating mirror temporally shearing resulting spatially encoded, and a camera spatiotemporally integrating a resulting spatially encoded and temporally sheared object into a second image; and a processing unit reconstructing the object from the first and the second images.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 2A shows images of core/shell upconverting nanoparticles acquired with a transmission electron microscope; scale bar: 25 nm;

FIG. 2B shows normalized upconversion spectra of upconverting nanoparticles shown in FIG. 2A;

FIG. 2C shows simplified energy level diagram of $Yb^{3+}$-$Er^{3+}$ energy transfer upconversion excitation and emission;

FIG. 2D shows temporally projected image of phosphorescence intensity decay of the 5.6-nm-thick-shell upconverting nanoparticles covered by a negative resolution target;

FIG. 2E shows a comparison of averaged light fluence distribution along the horizontal bars (I) and vertical bars (II) of Element 5 in Group 4 on the resolution target; error bar: standard deviation;

FIGS. 3A-3B show lifetime images of green (a) and red (b) upconversion emission bands under different temperatures;

FIGS. 3C-3D show normalized phosphorescence decay curves of green (FIG. 3C) and red (FIG. 3D) emission bands at different temperatures, averaged over the entire field of view;

FIG. 5 show image registration in dual-view data acquisition by single-shot photoluminescence lifetime imaging thermometry (SPLIT): FIG. 5A shows an image acquired in View 1; FIG. 5B shows an image acquired in View 2 without using optical shearing; FIG. 5C shows a co-registered image in View 1;

FIG. 6 show simulations of dual-view plug-and-play alternating direction method of multipliers (PnP-ADMM) reconstruction: FIG. 6A shows a comparison of representative frames of the reconstructed result with the ground truth; FIG. 6B shows a comparison of three local features in Frame 1 of the reconstructed result with the ground truth, marked by the red-=round-dotted line, magenta=square-dotted line, and black-dashed lines boxes; FIG. 6C shows normalized averaged intensity of the reconstructed result versus the frame index, the error bar representing standard deviation;

FIG. 8 show characterization sensitivity of the single-shot photoluminescence lifetime imaging thermometry (SPLIT)

FIG. 10 show comparison of quality of images reconstructed by using different algorithms: FIG. 10G, FIG. 10H and FIG. 10I show lifetime maps of the three letters produced by the single-view two-step iterative thresholding/ shrinkage (TwIST) method, showing single-view plug-and-play alternating direction method of multipliers (PnP-ADMM) in FIG. 10H, and plug-and-play alternating direction method of multipliers (PnP-ADMM) in FIG. 10I; insets showing zoom-in views of three local areas;

FIG. 12 show quantification of single-shot photoluminescence lifetime imaging thermometry (SPLIT)'s imaging depth: FIG. 12A shows experimental system; FIG. 12B shows temporally projected images of the reconstructed dynamic scene at the depth from 0 to 1 mm with green emission; FIG. 12*c* shows same as FIG. 12B for red emission; FIG. 12A shows comparison of normalized intensity of a representative cross-section, marked by the dashed line in the first panel in FIG. 12B, for various imaging depths; FIG. 12E same as FIG. 12D for red emission, the representative cross-section being marked by the dashed line in the first panel in FIG. 12C;

FIG. 14 B shows temporally projected images of the reconstructed dynamic scene at the depth from 0.09 to 0.60 mm with green emission.

FIG. 15 show single-layer onion cell sample.

FIG. 17 show comparison between line-scanning microscopy and single-shot photoluminescence lifetime imaging thermometry (SPLIT) in 2D photoluminescence lifetime imaging (PLI) capability: FIG. 17A shows a experimental system of line-scanning microscopy, the moving upconverting nanoparticles (UCNPs) sample beings loaded onto a translation stage, the moving directions being marked by arrows: FIG. 17B shows one-dimensional photoluminescence lifetime imaging (PLI) by using the line-scanning system; FIG. 17C shows a 2D temperature map synthesized by using the data in FIG. 17B; FIG. 17D shows seven 2D lifetime maps of the sample moving along vertical direction captured by using the single-shot photoluminescence lifetime imaging thermometry (SPLIT);

FIG. 18 shows a comparison between the thermal imaging camera and single-shot photoluminescence lifetime imaging thermometry (SPLIT) in temperature imaging: FIG. 18E and FIG. 18 show selected line profile from FIG. 18C and FIG. 18D, respectively.

DESCRIPTION OF ILLUSTRATIVE EMBODIMENTS

The present invention is illustrated in further details by the following non-limiting examples.

Figure 1:
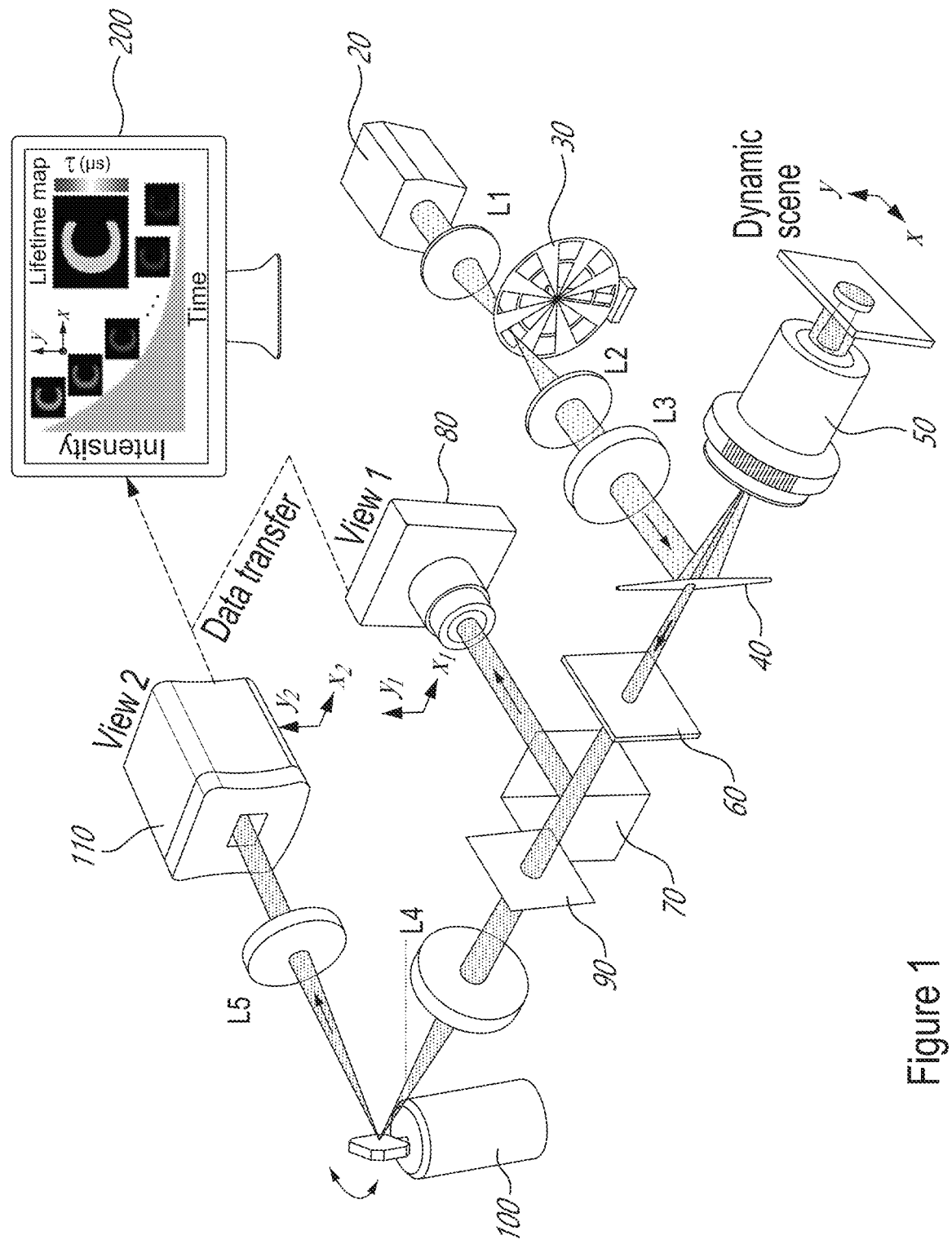
FIG. 1 is a schematic view of a system according to an embodiment of an aspect of the present disclosure.

A system according to an embodiment of an aspect of the present disclosure is illustrated for example in FIG. 1.

A laser beam from a laser source 20 passes through an expander consisting of a first 4f system consisting of lenses L1 and L2 (focal length 50-mm, singlet). A chopper 30 is placed at the back focal plane of the first lens L1 of 4f system to generate 50-µs optical pulses. Then, the pulses pass through a 100-mm focal length lens L3 and is reflected by a dichroic mirror 40 to generate a focus on the back focal plane of an objective lens 50 with a field of view of at least 1.5 mm×1.5 mm.

The laser source 20 may be a 980-nm continuous-wave laser or a 980-mm pulse laser. The expander may be an optical beam expander. The chopper 30 may be an optical chopper or an electro-optic modulator or an acoustic optical modulator. The dichroic mirror 40 may be a short-pass filter with a cut off wavelength of 750 nm.

This illumination configuration, using a 4f system to expand the diameter of the laser beam, produces wide-field illumination, with a 1.5×1.5 mm$^2$ field of view, to upconverting nanoparticles at the object plane.

The near-infrared excited upconverting nanoparticles emit upconverted phosphorescence light in the visible spectrum. The decay of light intensity over the 2D field of view is a dynamic scene I(x,y,t). The emitted light is collected by the objective lens 50, transmitted through the dichroic mirror 40, and is filtered by a band-pass filter 60. A beam splitter 70 then equally divides the light into a reflected and a transmitted components.

The reflected component is imaged by a complementary metal oxide semiconductor (CMOS) camera via spatiotemporal integration (operator T) as View 1, with optical energy distribution E1(x$_1$.y$_i$). Alternatively, charge-coupled device (CCD) cameras, scientific complementary metal oxide semiconductor (sCMOS) cameras, or electron-multiplying charged-coupled device (EMCCD) cameras may be used.

The transmitted component forms an image, using front optics such as a camera lens, an objective lens, and a telescope for imaging to an intermediate image plane, the dynamic scene on a transmissive encoding mask 90 with a pseudo-random binary pattern (Fineline Imaging, 50% transmission ratio; 60-µm encoding pixel size) (operator C). Alternatively, a spatial light modulator such as a digital micro-mirror device, or a printed mask loaded on a translation stage may be used. Then, the spatially encoded scene in the intermediate image plane is relayed by relay optics, such as by a second 4f imaging system (100-mm focal length lenses L4 and L5) as illustrated, or by a tube lens system, to the sensor plane of an electron-multiplying charged-coupled device (EMCCD) camera 110 for View 2 imaging. A global shutter scientific complementary metal oxide semiconductor (sCMOS) camera may also be used.

A galvanometer scanner 100, placed at the Fourier plane of the 4f imaging system, temporally shears (operator S) the spatially encoded frames linearly to different spatial locations along the x-axis of the electron-multiplying charged-coupled device (EMCCD) camera 110 according to their time of arrival. Other rotating mirror such as a polygonal scanner or a resonant scanners, may be used. Finally, the spatially encoded and temporally sheared dynamic scene is recorded by the electron-multiplying charged-coupled device (EMCCD) camera 110 via spatiotemporal integration, as View 2, with optical energy distribution $E_2(x_2.y_2)$.

Both images are transferred to a processing unit 200 and used for reconstruction of the object. The system may be described in a forward model as follows:

$$E = TMI(x,y,t), \quad (1)$$

where E is the concatenation of measurements $[E_1, \alpha E_2]^T$, M is a linear operator $[1, \alpha SC]^T$, and $\alpha$ is a scalar factor introduced to balance the energy ratio between the two views View 1 and View 2 during measurement. After data acquisition, E is obtained by retrieving the datacube of the dynamic scene by leveraging the spatiotemporal sparsity of the dynamic scene and the prior knowledge of each operator. Based on the plug-and-play alternating direction method of multipliers (PnP-ADMM), reconstruction is achieved by solving the following minimization problem:

$$\hat{I} = \underset{I}{\operatorname{argmin}} \left\{ \frac{1}{2} \|TMI - E\|_2^2 + R(I) + I_+(I) \right\}. \quad (2)$$

$\|\cdot\|_2^2$ represents the $l_2$ norm, $$\frac{1}{2} \|TMI - E\|_2^2$$

is a fidelity term representing the similarity between the measurement and the estimated result. $R(\cdot)$ is the implicit regularizer that promotes sparsity in the dynamic scene. $I_+(\cdot)$ represents a non-negative intensity constraint Plug-and-play alternating direction method of multipliers (PnP-ADMM) implements a variable splitting strategy with a state-of-the-art denoiser to obtain fast and closed-form solutions to each sub-optimization problem, which produces a high image quality in reconstruction. The retrieved datacube of the dynamic scene has a sequence depth, defined as the number of frames in a reconstructed movie, of 12-100 frames, each containing 460×460 (x, y) pixels. The imaging speed is tunable from 4 to 33 thousand frames per second (kfps).

The reconstructed datacube is then converted to a photoluminescence lifetime map. In particular, for each (x, y) point, the area under the normalized intensity decay curve is integrated to report the value of the photoluminescence lifetime. Finally, using the approximately linear relationship between the lifetime of the upconverting nanoparticles (UCNPs) and the physiologically relevant temperature range, between 2° and 46° C. in the present experiment, the 2D temperature distribution, T(x, y), is calculated as follows:

$$T(x, y) = c_t + \frac{1}{S_a} \int \frac{\hat{i}(x, y, t)}{\hat{i}(x, y, 0)} dt, \quad (3)$$

$c_t$ is a constant, and $S_a$ is the absolute temperature sensitivity. Leveraging the intrinsic frame rate of the charged-coupled device (EMCCD) camera 110, the system can generate lifetime-determined temperature maps at a video rate of 20 Hz.

Figure 2F:
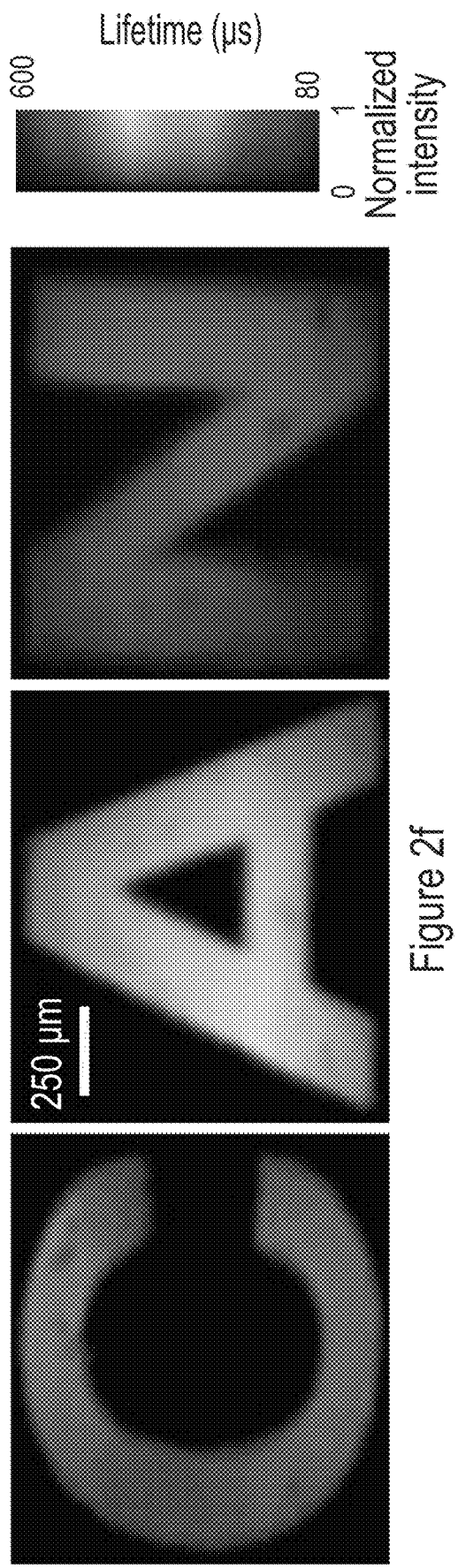
FIG. 2F shows lifetime maps of upconverting nanoparticles with the shell thicknesses of 1.9 nm, 3.5 nm, and 5.6 nm covered by transparencies of letters "C", "A", and "N" in green emission.
Figure 2G:
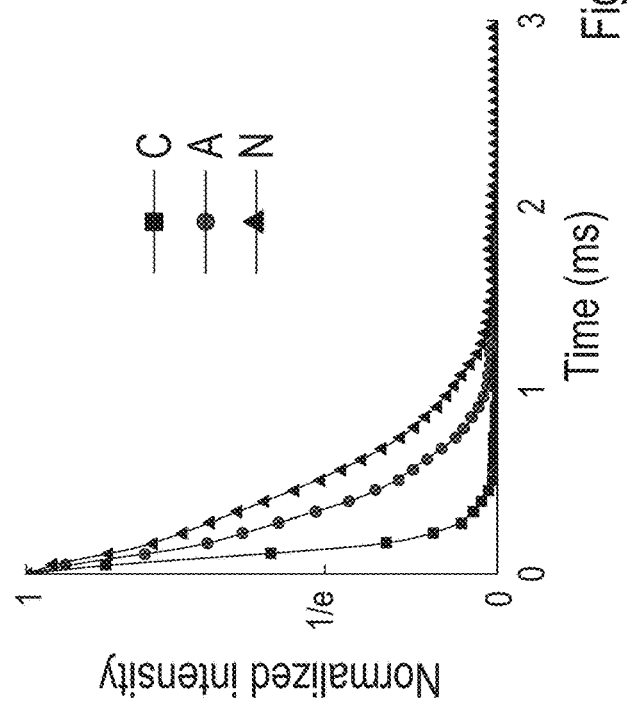
FIG. 2G shows time-lapse averaged phosphorescence emission intensities of the samples.
Figure 2H:
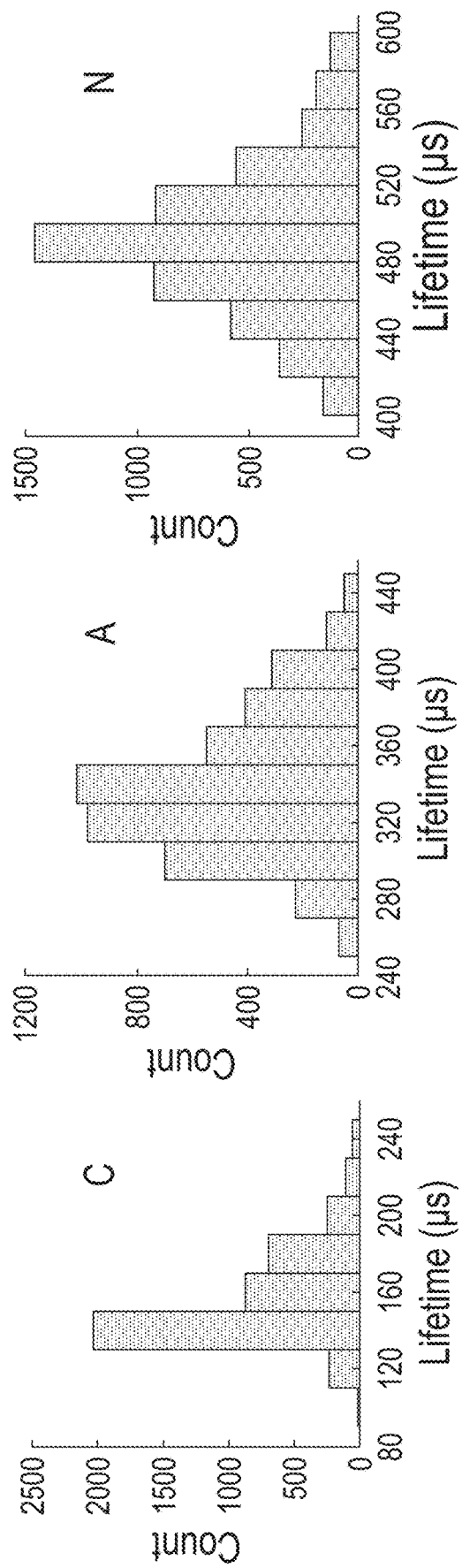
FIG. 2H shows histograms of phosphorescence lifetimes in the letters shown in FIG. 2F.

FIG. 2A shows images of core/shell upconverting nanoparticles acquired with a transmission electron microscope. FIG. 2B shows normalized upconversion spectra of upconverting nanoparticles shown in FIG. 2A. FIG. 2C shows simplified energy level diagram of Yb3+-Er3+ energy transfer upconversion excitation and emission. FIG. 2D shows temporally projected image of phosphorescence intensity decay of the 5.6-nm-thick-shell upconverting nanoparticles covered by a negative resolution target. FIG. 2E shows a comparison of averaged light fluence distribution along the horizontal bars (I) and vertical bars (II) of Element 5 in Group 4 on the resolution target. FIG. 2F shows lifetime maps of upconverting nanoparticles with the shell thicknesses of 1.9 nm, 3.5 nm, and 5.6 nm covered by transparencies of letters "C", "A", and "N" in green emission. FIG. 2G shows time-lapse averaged phosphorescence emission intensities of the samples. FIG. 2H shows histograms of phosphorescence lifetimes in the letters shown in FIG. 2F.

Figure 3E:
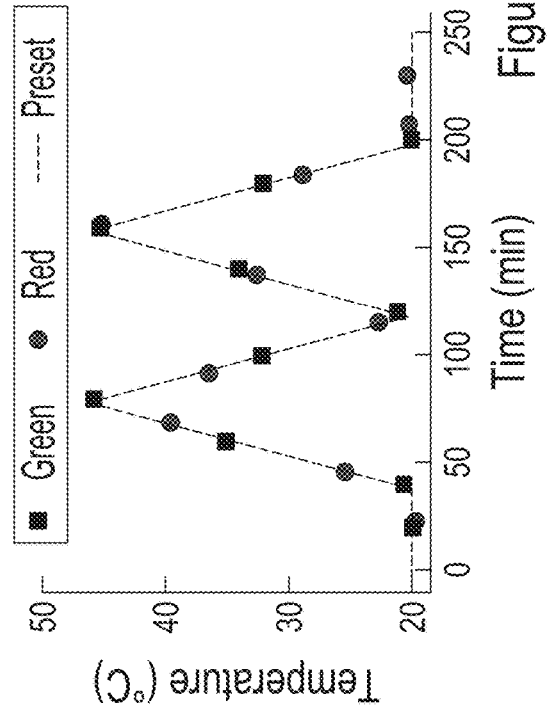
FIG. 3E shows the relationship between temperature and mean lifetimes of green and red emissions with linear fitting, error bar indicating standard deviation from three independent measurements.
Figure 3G:
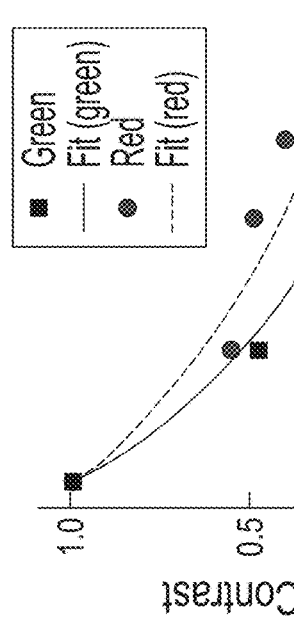
FIG. 3G shows longitudinal temperature monitoring of a phantom covered by 0.5 mm-thick chicken tissue.
Figure 3F:
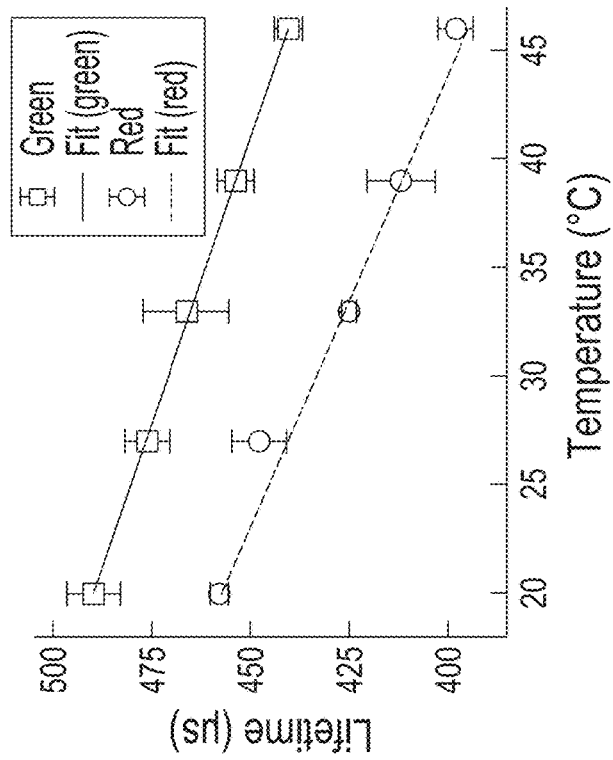
FIG. 3F shows the normalized contrast versus tissue thickness for green and red emission bands fitted by using the Beer's law.

FIG. 3 show single-shot temperature mapping using single-shot photoluminescence lifetime imaging thermometry (SPLIT). FIGS. 3A-3B show lifetime images of green (A) and red (»B) upconversion emission bands under different temperatures. FIGS. 3C-3D show normalized phosphorescence decay curves of green (C) and red (D) emission bands at different temperatures, averaged over the entire field of view. FIG. 3E shows the relationship between temperature and mean lifetimes of green and red emissions with linear fitting. FIG. 3F shows the normalized contrast versus tissue thickness for green and red emission bands with single-component exponential fitting. FIG. 3G shows longitudinal temperature monitoring of a phantom covered by 0.5 mm-thick chicken tissue.

Figure 4A:
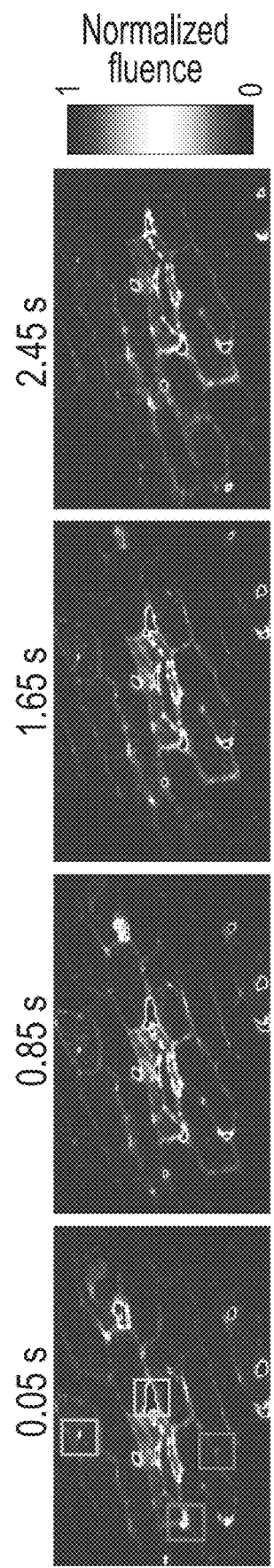
FIG. 4A shows representative time-integrated images of a moving onion epidermis cell sample labeled by upconverting nanoparticles.
Figure 4B:
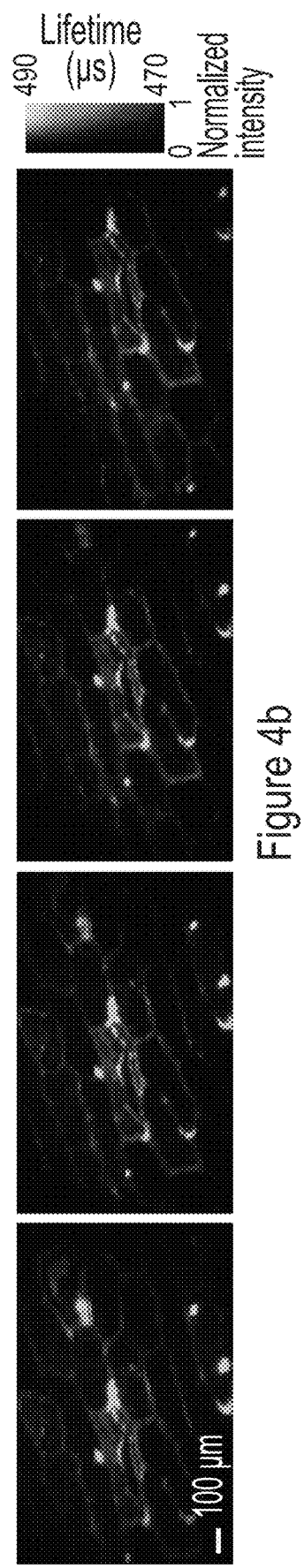
FIG. 4B shows phosphorescence lifetime images corresponding to FIG. 4A.
Figures 4C, 4D:
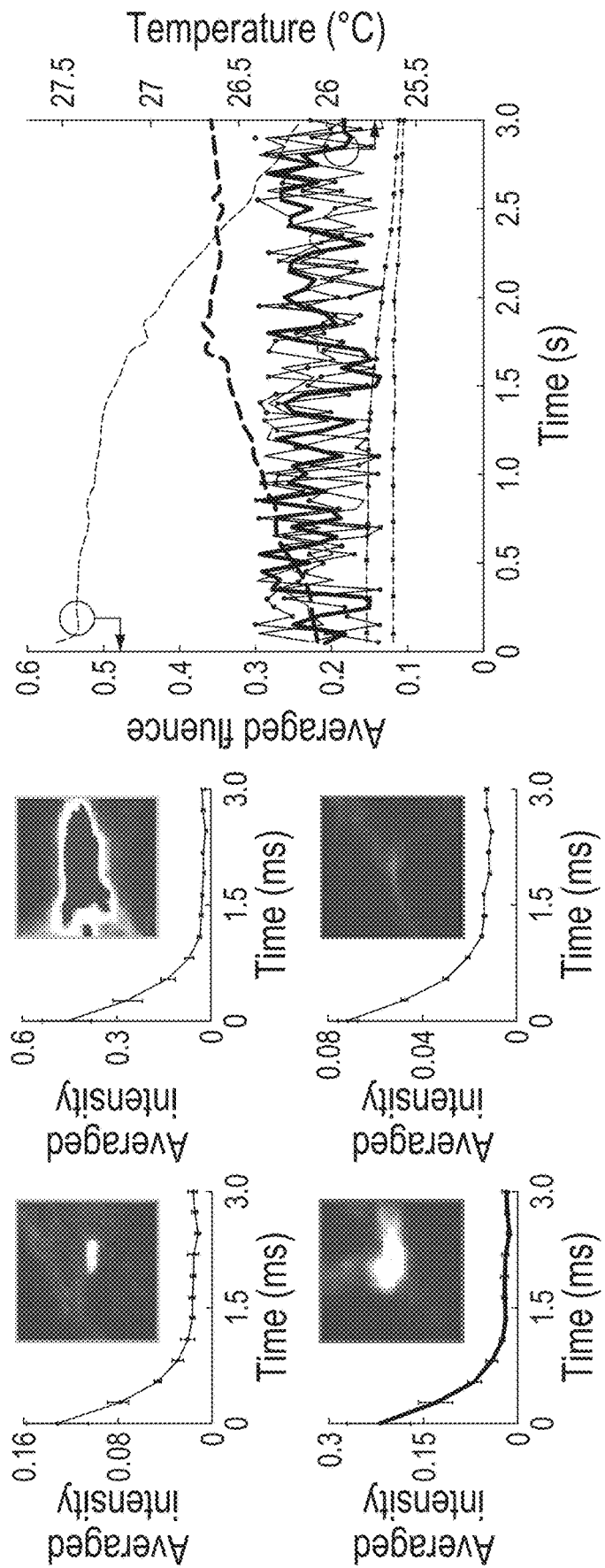
FIG. 4C shows phosphorescence decay at four selected areas, marked by the solid boxes in the first panel of FIG. 4A, with different intensities.
FIG. 4D shows time histories of averaged fluence and corresponding temperature in four selected regions during translational motion of the sample.

FIG. 4 show dynamic single-cell temperature mapping. FIG. 4A shows representative time-integrated images of a moving onion epidermis cell sample labeled by upconverting nanoparticles. FIG. 4B shows phosphorescence lifetime images corresponding to FIG. 4A. FIG. 4C shows phosphorescence decay at four selected areas, marked by the solid boxes in the first panel of FIG. 4A, varied intensities. FIG. 4D shows time histories of averaged fluence and corresponding temperature in the four selected regions during the sample's translational motion.

The present optical temperature mapping method synergistically combines dual-view optical streak imaging with compressed sensing, to record wide-field luminescence decay of $Er^{3\pm}$, $Yb^{3+}$ co-doped NaGdF4 upconverting nanoparticles in real time, from which a lifetime-based 2D temperature map is obtained in a single exposure. The method enables high-resolution longitudinal temperature monitoring beneath a thin scattering medium and dynamic temperature tracking of a moving biological sample at single-cell resolution.

Thus a method according to an aspect of the present disclosure comprises producing wide-field illumination to upconverting nanoparticles at the object plane, by expanding the laser beam diameter, using a 4f system or an optical beam expander for example. The near-infrared excited upconverting nanoparticles emit upconverted phosphorescence light in the visible spectrum. The decay of the emitted light intensity over the 2D field of view is a dynamic scene I(x,y,t). The emitted light is collected and equally divided into a reflected component and a transmitted component. The method then comprises imaging the reflected component (View 1) by spatiotemporal integration using a complementary metal oxide semiconductor (CMOS) camera, a charge-coupled device (CCD) camera, a scientific complementary metal oxide semiconductor (sCMOS) camera, or an electron-multiplying charged-coupled device (EMCCD) camera for example, and imaging the transmitted component (View 2) by spatial encoding using a printed mask or a spatial light modulator such as a digital micro-mirror device, or a printed mask loaded on a translation stage, temporal shearing, using a rotating mirror such as a galvanometer scanner, a polygonal scanner or a resonant scanner for example, and spatiotemporal integration, using a highly sensitive cameras such as an electron-multiplying charged-coupled device (EMCCD) or a global shutter scientific complementary metal oxide semiconductor (sCMOS) for example. The data of the images are processed for denoising, cropping, and calibration of the obtained two views, and video reconstruction or compressed sensing based video reconstruction is performed.

In the present single-shot phosphorescence lifetime imaging thermometry method, high parallelism in the data acquisition improves the overall light throughput. The method, comprising single-shot temperature sensing over a 2D field of view, allows improved measurement accuracy by avoiding scanning motion artifacts and laser intensity fluctuation. The present single-shot phosphorescence lifetime imaging thermometry method and system extend the application scope of phosphorescence lifetime imaging to observing non-repeatable temperature dynamics. They allow high tunability of imaging speeds, which accommodates a variety of upconverting nanoparticles with a wide lifetime span.

From the perspective of system design, both the dual-view data acquisition and the plug-and-play alternating direction method of multipliers (PnP-ADMM) method support high imaging quality in the present single-shot phosphorescence lifetime imaging thermometry system and method. In particular, View 1 preserves the spatial information in the dynamic scene. Meanwhile, View 2 retains temporal information by optical streaking via time-to-space conversion. Altogether, both views maximally keep rich spatiotemporal information. In software, the plug-and-play alternating direction method of multipliers (PnP-ADMM) method provides a powerful modular structure, which allows separated optimization of individual sub-optimization problems with an advanced denoising algorithm to generate high-quality image restoration results.

The present single-shot phosphorescence lifetime imaging thermometry method and system provide a versatile temperature-sensing platform. In materials characterization, they may be used in the stress analysis of metal fatigue in turbine blades. In biomedicine, they may be implemented for accurate sub-cutaneous temperature monitoring for theranostics of skin diseases such as melanoma. The microscopic temperature mapping ability may also be exploited for the studies of temperature-regulated cellular signaling. Finally, the operation of the method and system may be extended to Stokes emission in rare-earth nanoparticles and spectrally resolved temperature mapping.

More details are discussed hereinbelow, presenting the optical temperature mapping system and method according to embodiments of the present disclosure, referred to as single-shot photoluminescence lifetime imaging thermometry (SPLIT). Synergistically combining dual-view optical streak imaging with compressed sensing, single-shot photoluminescence lifetime imaging thermometry (SPLIT) records wide-field luminescence decay of $Er^{3+}$, $Yb^{3+}$ co-doped $NaGdF_4$ Upconverting nanoparticles (UCNPs) in real time, from which a lifetime-based 2D temperature map is obtained in a single exposure. Thus single-shot photoluminescence lifetime imaging thermometry (SPLIT) enables longitudinal 2D temperature monitoring beneath a thin scattering medium and dynamic temperature tracking of a moving biological sample at single-cell resolution.

A single-shot photoluminescence lifetime imaging thermometry (SPLIT) system according to an embodiment of an aspect of the present invention is shown in FIG. 1, showing data acquisition and image reconstruction of luminescence intensity decay in a letter "C". As described hereinabove, a 980-nm continuous-wave laser (BWT, DS3-11312-113-LD) is used as the light source. The laser beam passes through a 4f system consisting of two 50-mm focal length lenses (L1 and L2, Thorlabs, LA1255). An optical chopper (Scitec Instruments, 300CD) is placed at the back focal plane of lens L1 to generate 50-µs optical pulses. Then, the pulse passes through a 100-mm focal length lens (L3, Thorlabs, AC254-100-B) and is reflected by a short-pass dichroic mirror (Edmund Optics, 69-219) to generate a focus on the back focal plane of an objective lens (Nikon, CF Achro 4×). This illumination scheme produces wide-field illumination (1.5× 1.5 $mm^2$ field of view (FOV)) to Upconverting nanoparticles (UCNPs) at the object plane.

The near-infrared excited Upconverting nanoparticles (UCNPs) emit light in the visible spectral range. The decay of light intensity over the 2D field of view (FOV) is a dynamic scene, denoted by I(x, y, t). The emitted light is collected by the same objective lens, transmits through the dichroic mirror, and is filtered by a band-pass filter (Thorlabs, MF542-20 or Semrock, FF01-660/30-25). Then, a beam splitter (Thorlabs, BS013) equally divides the light into two components. The reflected component is imaged by a complementary metal oxide semiconductor (CMOS) camera (FLIR, GS3-U3-23S6M-C) with a camera lens (Fujinon, HF75SA1) via spatiotemporal integration (denoted as the operator T) as View 1, whose optical energy distribution is denoted by $E_1(x_1, y_1)$.

The transmitted component forms an image of the dynamic scene on a transmissive encoding mask with a pseudo-random binary pattern (Fineline Imaging, 50% transmission ratio; 60-µm encoding pixel size). This process of spatial encoding is denoted by the operator C. Then, the spatially encoded scene is relayed to the sensor plane of an electron-multiplying (EM) CCD camera (Nüvü Cameras, HNü 1024) by another 4f imaging system consisting of two 100-mm focal length lenses (L4 and L5, Thorlabs, AC254-100-A). A galvanometer scanner (Cambridge Technology, 6220H), placed at the Fourier plane of the 4f imaging system, temporally shears the spatially encoded frames linearly to different spatial locations along the $x_2$-axis of the electron-multiplying charged-coupled device (EMCCD) camera according to their time of arrival. This process of temporal shearing is denoted by the operator S. Finally, the spatially encoded and temporally sheared dynamic scene is recorded by the EMCCD via spatiotemporal integration to form View 2, whose optical energy distribution is denoted by $E_2(x_2, y_2)$.

By combining the image formation of $E_1(x_1, y_1)$ and $E_2(x_2, y_2)$, the data acquisition of single-shot photoluminescence lifetime imaging thermometry (SPLIT) is expressed as follows:

$$E = TMI, \quad (1)$$

E denotes the concatenation of measurements $[E_1, \alpha E_2]^T$, M denotes the linear operator $[1, \alpha SC]^T$, and $\alpha$ is a scalar factor introduced to balance the energy ratio between the two views during measurement. The hardware of the single-shot photoluminescence lifetime imaging thermometry (SPLIT) system is synchronized for capturing both views (detailed in Methods) that are calibrated before data acquisition (see Supplementary Note 1 and FIG. 5).

After data acquisition, E is processed an algorithm that retrieves the datacube of the dynamic scene by leveraging the spatiotemporal sparsity of the dynamic scene and the prior knowledge of each operator. Developed from the plug-and-play alternating direction method of multipliers (PnP-ADMM) method, the reconstruction algorithm of single-shot photoluminescence lifetime imaging thermometry (SPLIT) solves the following minimization problem:

$$\hat{I} = \underset{I}{\mathrm{argmin}} \left\{ \frac{1}{2} \|TMI - E\|_2^2 + R(I) + I_+(I) \right\}. \quad (2)$$

$\|\cdot\|_2$ represents the $l_2$ norm. The fidelity term, $$\frac{1}{2}\|TMI - E\|_2^2,$$

represents the similarity between the measurement and the estimated result. $R(\cdot)$ is the implicit regularizer that promotes sparsity in the dynamic scene. $I_+(\cdot)$ represents a non-negative intensity constraint. Compared to existing reconstruction schemes, the plug-and-play alternating direction method of multipliers (PnP-ADMM) method implements a variable splitting strategy with a state-of-the-art denoiser to obtain fast and closed-form solutions to each sub-optimization problem, which produces a high image quality in reconstruction (see FIG. 6 and Supplementary Notes 2 and 3). The retrieved datacube of the dynamic scene has a sequence depth, that is the number of frames in a reconstructed movie, of 100 frames, each containing 460× 460 (x, y) pixels. The imaging speed is tunable from 4 to 33 thousand frames per second (kfps).

A photoluminescence lifetime map is then generated by integrating the area under the decay curve[50]. Finally, using the approximately linear relationship between the UCNPs' lifetime and the physiologically relevant temperature range (20-46° C. in the present experiment), the 2D temperature distribution, T(x, y), is calculated as follows:

$$T(x, y) = c_t + \frac{1}{S_a} \int \frac{\hat{I}(x, y, t)}{\hat{I}(x, y, 0)} dt, \quad (3)$$

$c_t$ is a constant, and $S_a$ is the absolute temperature sensitivity. The derivation of Relation 3 is detailed in Supplementary Note 4 hereinbelow. Leveraging the intrinsic frame rate of the electron-multiplying charged-coupled device (EMCCD) camera, the photoluminescence lifetime imaging thermometry (SPLIT) system can generate lifetime-determined temperature maps at a video rate of 20 Hz.

Figure 7:
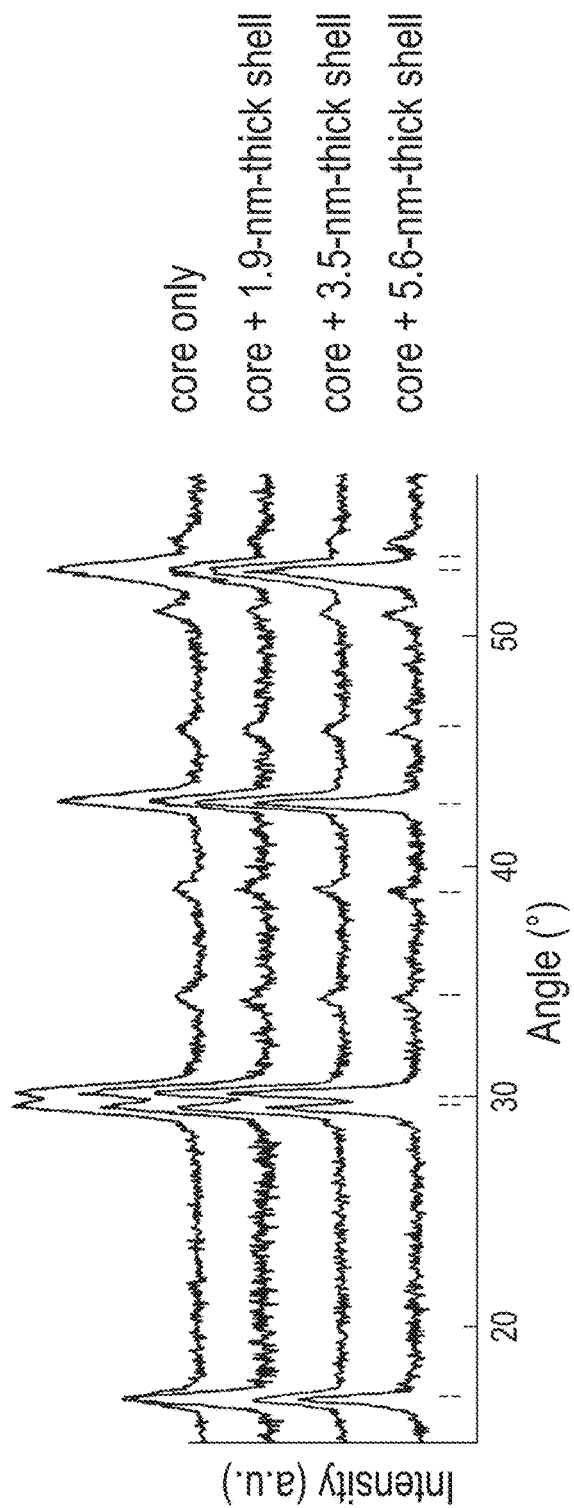
FIG. 7 shows X-ray powder diffraction patterns of upconverting nanoparticles (UCNPs), the core-only and core/shell $NaGdF_4:Er^{3+}$, $Yb^{3+}/NaGdF_4$ upconverting nanoparticles (UCNPs) following their growth by increasing the shell thickness; red dotted lines showing diffraction peaks of pure hexagonal $NaGdF_4$.

For quantification of the system's performance of single-shot photoluminescence lifetime imaging thermometry (SPLIT), a series of core/shell upconverting nanoparticle (UCNP) samples were prepared to showcase the single-shot photoluminescence lifetime imaging thermometry (SPLIT) imaging and temperature sensing capabilities. These upconverting nanoparticles (UCNPs) shared the same $NaGdF_4$: 2 mol % $Er^{3+}$, 20 mol % $Yb^{3+}$ active core of 14.6 nm in size, while differed by the thickness of their undoped $NaGdF_4$ passive shell of 1.9, 3.5, and 5.6 nm (FIG. 2A and Supplementary Note 5 hereinbelow). All of the upconverting nanoparticles (UCNPs) samples were of pure hexagonal crystal phase (FIG. 7). Under the 980-nm excitation, upconversion emission bands of all samples were measured at around 525/545 and 660 nm, which correspond to the $^2H_{11/2}/^4S_{3/2} \rightarrow {}^4I_{15/2}$ and $^4F_{9/2} \rightarrow {}^4I_{15/2}$ radiative transitions, respectively (FIGS. 2B-2C).

To characterize the spatial resolution of single-shot photoluminescence lifetime imaging thermometry (SPLIT), the 5.6 nm-thick-shell upconverting nanoparticle (UCNP) sample was covered with a negative USAF resolution target (Edmund Optics, 55-622). Operating at 33 kfps, single-shot photoluminescence lifetime imaging thermometry (SPLIT) recorded the photoluminescence decay. The temporally projected datacube reveals that the intensity and contrast in the reconstructed image degrade with the decreased spatial feature sizes, eventually leading to the loss of structure whose size approaches that of the encoding pixel (FIG. 2D). The spatial resolution was thus determined to be 20 µm (FIG. 2E). Under these experimental conditions, the minimum power density for the single-shot photoluminescence lifetime imaging thermometry (SPLIT) system was quantified to be 0.06 W/mm² (see Supplementary Note 6 hereinbelow and FIG. 8).

To demonstrate the ability of single-shot photoluminescence lifetime imaging thermometry (SPLIT) to distinguish different lifetimes, the Upconverting nanoparticles (UCNPs) were imaged with shell thicknesses of 1.9 nm, 3.5 nm, and 5.6 nm, covered by transparencies of letters "C", "A", and "N", respectively, using a single laser pulse. The lifetime maps of these samples are shown in FIG. 2F, which reveals the averaged lifetimes for the $^4S_{3/2}$ excited state of samples "C", "A", and "N" to be 142 µs, 335 µs, and 478 µs, respectively (FIGS. 2G-2H). These results were verified by using the standard time-correlated single-photon counting (TCSPC) method (see Supplementary Note 7 hereinbelow and FIG. 9).

Single-shot photoluminescence lifetime imaging thermometry (SPLIT) reconstruction method is thus shown to match existing mainstream algorithms popularly used in single-shot compressed ultrafast imaging. By using the experimental data, the comparison demonstrates that the dual-view plug-and-play alternating direction method of multipliers (PnP-ADMM) used by single-shot photoluminescence lifetime imaging thermometry (SPLIT) is more powerful in preserving spatial features while maintaining a low background, which enables a more accurate lifetime quantification and the ensuing temperature mapping (see Supplementary Note 8 hereinbelow and FIG. 10).

For single-shot temperature mapping using single-shot photoluminescence lifetime imaging thermometry (SPLIT), the 5.6 nm-thick-shell upconverting nanoparticles (UCNPs) was used as the temperature indicator for single-shot photoluminescence lifetime imaging thermometry (SPLIT). The temperature of the upconverting nanoparticles (UCNPs) was controlled by a heating plate placed behind the sample. To image the green ($^4S_{3/2}$) and red ($^4F_{9/2}$) upconversion emissions, the sample was covered by transparencies of a lily flower and a maple leaf, respectively. The temperature of the entire sample was measured with both a Type K thermocouple (Omega, HH306A) and a thermal camera (FLIR, E4) as references. The reconstructed lifetime images in the 20-46° C. temperature range are shown in FIGS. 3A, 3B. Plotted in FIGS. 3C, 3D, the time-lapse averaged intensity over the entire field of view (FOV) shows that the averaged lifetimes of green and red emissions decrease from 489 to 440 µs and from 458 to 398 µs, which is due to their enhanced multiphonon deactivation at higher temperatures. The relationship between the temperatures and lifetimes for both emission channels (FIG. 3E) was further plotted Finally, the temperature sensitivities in the preset temperature range were calculated to be $S_a$=−1.90 µs/° C. for green emission and $S_a$=−2.40 µs/° C. for red emission (see Supplementary Note 9 and FIG. 11). The higher temperature sensitivity of the red-emitting state compared to the green state results from the greater energy separation from their respective lower-laying excited states. Since multiphoton relaxation rate depends exponentially on the number of phonons necessary to non-radioactively deactivate a given excited state to the one just below, the temperature-induced changes to the phonon energies (reducing the number of required phonons for quenching) will have a greater influence over the excited states with larger energy gap between each other. These results establish lifetime-temperature calibration curves (see Relation 3) for ensuing thermometry experiments.

To demonstrate the feasibility of single-shot photoluminescence lifetime imaging thermometry (SPLIT) in a biological environment, longitudinal temperature monitoring under a phantom, made by using the 5.6 nm-thick-shell upconverting nanoparticles (UCNPs) covered by lift-out grids (Ted Pella, 460-2031-S), overlaid by fresh chicken breast tissue, was performed. The imaging depth of single-shot photoluminescence lifetime imaging thermometry (SPLIT) was investigated with varied tissue thicknesses of up to 1 mm (FIG. 3F, FIG. 12, Supplementary Note 10). The chicken tissue of 0.5 mm thickness, where both the green and red emissions produced images with full spatial features of the lift-out grid, was used in the following imaging experiments. Subsequently, the temperature of the sample was cycled between 20° C. and 46° C. The lifetime distributions of both green and red emissions and their corresponding temperature maps were monitored every 20 minutes and 23 minutes, respectively, for about 4 hours (see the full evolution in FIG. 13). As shown in FIG. 3G, the results are in good agreement with the temperature change preset by the heating plate, and decisively showcase how single-shot photoluminescence lifetime imaging thermometry (SPLIT) can noninvasively map 2D temperatures over time with high accuracy beneath biological tissue.

Single-shot photoluminescence lifetime imaging thermometry (SPLIT) was also demonstrated using a fresh beef phantom as a scattering medium, where both water and blood are present (FIG. 14 and Supplementary Note 10). The results reveal better penetration of red emission over the green counterpart due to its weaker scattering and absorption by blood. More importantly, the results confirm the independence of the measured photoluminescence lifetime of upconverting nanoparticles (UCNPs) to tissue thickness and hence the excitation light power density in the present example (≤0.4 W/mm²).

Figure 15B:
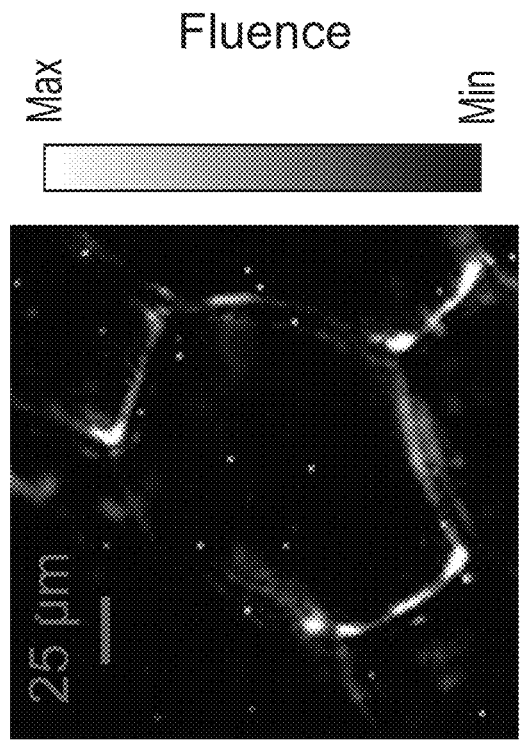
FIG. 15B shows a confocal microscopy of green upconversion emission of upconverting nanoparticles (UCNPs) diffused in an individual onion cell, marked by the dashed box in FIG. 15A.
Figure 15A:
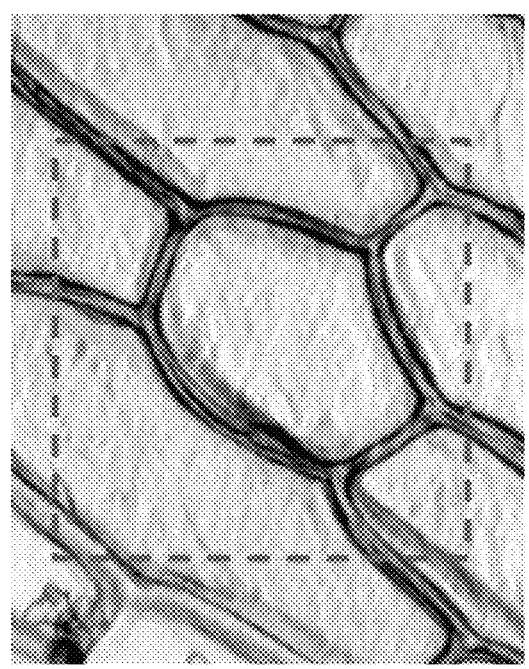
FIG. 15A shows an image of the sample taken by a bright field microscope.

In tests of single-cell dynamic temperature tracking using single-shot photoluminescence lifetime imaging thermometry (SPLIT), to apply single-shot photoluminescence lifetime imaging thermometry (SPLIT) to dynamic single-cell temperature mapping, a single-layer onion epidermis sample labeled by the 5.6 nm-thick-shell upconverting nanoparticles (UCNPs) (Supplementary Note 11 and FIG. 15) was tested. Further, to generate non-repeatable photoluminescent dynamics, the sample was moved across the field of view (FOV) at a speed of 1.18 mm/s by a translation stage. In the 3-second measurement window, the single-shot photoluminescence lifetime imaging thermometry (SPLIT) system continuously recorded 60 temperature maps. Four representative time-integrated images and their corresponding lifetime maps are shown in FIGS. 4A, 4B. FIG. 4C shows intensity decay curves from four selected intensity regions with varied intensity in the onion cell sample at 0.05 seconds. The photoluminescence lifetimes and hence the temperature remain stable, showing the resilience of single-shot photoluminescence lifetime imaging thermometry (SPLIT) to spatial intensity variation. The time histories of the averaged emitted fluence and lifetime-indicated temperature of these four regions during the sample's translational moving (FIG. 4D) were also tracked. In this measurement window, the emitted photoluminescence fluence has varied in the selected regions. In contrast, the measured temperature shows a small fluctuation of ±0.35° C., which validates the advantage of photoluminescence lifetime imaging (PLI) thermometry in handling temporal intensity variation.

In summary, single-shot photoluminescence lifetime imaging thermometry (SPLIT) is presented herein for wide-field dynamic temperature sensing in real-time. In data acquisition, single-shot photoluminescence lifetime imaging thermometry (SPLIT) compressively records the photoluminescence emission over a 2D field of view (FOV) in two views. Then, the developed plug-and-play alternating direction method of multipliers (PnP-ADMM) reconstructs spatially resolved intensity decay traces, from which a photoluminescence lifetime distribution and the corresponding temperature map are extracted. Used with core/shell $NaGdF_4:Er^{3+}$, $Yb^{3+}/NaGdF_4$ UCNPs, single-shot photoluminescence lifetime imaging thermometry (SPLIT) has enabled temperature mapping with high sensitivity for both green and red upconversion emission bands with a 20-µm spatial resolution in a 1.5×1.5 mm² field of view (FOV) at a video rate of 20 Hz. Single-shot photoluminescence lifetime imaging thermometry (SPLIT) is demonstrated in longitudinal temperature monitoring of a phantom beneath chicken and beef tissues. Single-shot photoluminescence lifetime imaging thermometry (SPLIT) is also applied to dynamic single-cell temperature mapping of a moving single-layer onion epidermis sample.

Single-shot photoluminescence lifetime imaging thermometry (SPLIT) advances the technical frontier of optical instrumentation in photoluminescence lifetime imaging thermometry. The high parallelism in data acquisition by Single-shot photoluminescence lifetime imaging thermometry (SPLIT) drastically improves the overall light throughput. The resulting system, featuring single-shot temperature sensing over a 2D field of view (FOV), solves the long-standing issue in scanning-based techniques (Supplementary Note 12, FIG. 17). In particular, Single-shot photoluminescence lifetime imaging thermometry (SPLIT) improves the measurement accuracy by avoiding scanning motion artifacts and laser intensity fluctuation. More importantly, as shown in FIG. 4, Single-shot photoluminescence lifetime imaging thermometry (SPLIT) extends the application scope of photoluminescence lifetime imaging (PLI) to observing non-repeatable temperature dynamics for the first time. Its high tunability of imaging speeds also accommodates a variety of upconverting nanoparticles (UCNPs) with a wide lifetime span, from hundreds of nanoseconds to milliseconds. Thus, Single-shot photoluminescence lifetime imaging thermometry (SPLIT) is shown to be well suited for dynamic photoluminescence lifetime imaging (PLI) in terms of the targeted imaging speed, detection sensitivity, spatial resolution, and cost efficiency (Supplementary Note 12, Supplementary Table 1 hereinbelow). Finally, the single-shot photoluminescence lifetime imaging thermometry (SPLIT) system by itself records only the lifetime images; yet, when using upconverting nanoparticles (UCNPs) as contrast agents, those images also carry temperature information in situ, where the Upconverting nanoparticles (UCNPs) reside. Compared to thermal imaging cameras, single-shot photoluminescence lifetime imaging thermometry (SPLIT) provides improved temperature mapping results with higher image contrast and better resilience to background interference (Supplementary Note 13 and FIG. 18).

From the perspective of system design, both the dual-view data acquisition and the plug-and-play alternating direction method of multipliers (PnP-ADMM) support high imaging quality in single-shot photoluminescence lifetime imaging thermometry (SPLIT). In particular, View 1 preserves the spatial information in the dynamic scene. Meanwhile, View 2 retains temporal information by optical streaking via time-to-space conversion. Altogether, both views maximally keep rich spatiotemporal information. In software, the dual-view plug-and-play alternating direction method of multipliers (PnP-ADMM) provides a powerful modular structure, which allows separated optimization of individual sub-optimization problems with an advanced denoising algorithm to generate high-quality image restoration results.

Single-shot photoluminescence lifetime imaging thermometry (SPLIT) is thus shown to offer a versatile photoluminescence lifetime imaging (PLI) temperature-sensing methods. In materials characterization, it could be used in the stress analysis of metal fatigue in turbine blades 55. In biomedicine, it will be implemented for accurate sub-cutaneous temperature monitoring for theranostics of skin diseases, for example micro-melanoma. The microscopic temperature mapping ability of single-shot photoluminescence lifetime imaging thermometry (SPLIT) could also be exploited for the studies of temperature-regulated cellular signaling. Finally, the operation of single-shot photoluminescence lifetime imaging thermometry (SPLIT) may be extended to Stokes emission in rare-earth nanoparticles and spectrally resolved temperature mapping. All of these topics are promising research directions in the future.

For synchronization of the single-shot photoluminescence lifetime imaging thermometry (SPLIT) system, the optical chopper outputs a TTL signal that is synchronized with the generated optical pulses. This TTL signal is input to a delay generator (Stanford Research Systems, DG 645), which then generates three synchronized TTL signals at 20 Hz. The first two signals are used to trigger the 3-ms exposure of the electron-multiplying charged-coupled device (EMCCD) and complementary metal oxide semiconductor (CMOS) cameras. The complementary metal oxide semiconductor (CMOS) camera is used to trigger a function generator (Rigol, DG1022Z) that outputs a 20-Hz sinusoidal waveform under the external burst mode to control the rotation of the galvanometer scanner.

Figure 19:
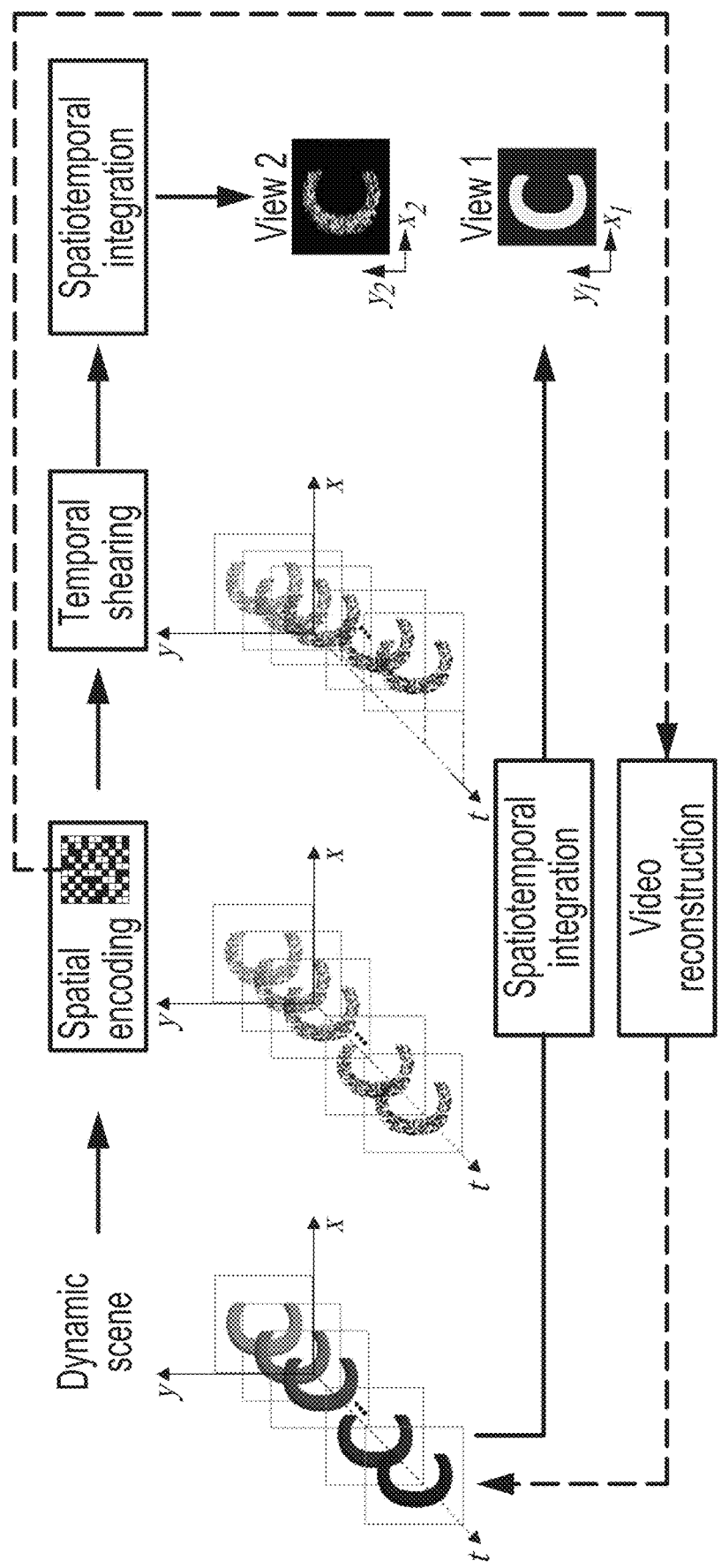
FIG. 19 is an illustration of the principle of single-shot photoluminescence lifetime imaging thermometry (SPLIT).

Parameters of single-shot photoluminescence lifetime imaging thermometry (SPLIT) may be determined as follows. The galvanometer scanner (GS) placed at the Fourier plane of the 4f imaging system consisting of lenses L4 and L5 (FIG. 1) deflects temporal information to different spatial positions. Rotating during the data acquisition, the galvanometer scanner (GS) changes the reflection angles of the spatial frequency spectra of individual frames with different time-of-arrival. After the Fourier transformation by Lens 5, this angular difference is converted to the lateral shift in space on the electron-multiplying charged-coupled device (EMCCD) camera, which results in temporal shearing. An illustration with a simple example is provided in FIG. 19.

The imaging speed is determined by the data acquisition for View 2. In particular, the reconstructed movie has a frame rate as follows:

$$r = \frac{\gamma_a V_g f_5}{t_s d}. \quad (M1)$$

$V_g$ is the voltage added onto the GS. $\gamma_a$ is a constant that links $V_g$ with GS's deflection angle with the consideration of the input waveform. $f_5=100$ mm is the focal length of lens L5, $t_s=50$ ms is the period of the sinusoidal voltage waveform added to the GS, and d=13 μm is the electron-multiplying charged-coupled device (EMCCD) sensor's pixel size. In the present example, the voltage is varied from V=0.24-1.11 V. Thus, the imaging speed of the photoluminescence lifetime imaging thermometry (SPLIT) system ranges from 4 to 33 kfps. In addition, the exposure time of the electron-multiplying charged-coupled device (EMCCD) and complementary metal oxide semiconductor (CMOS) cameras, $t_e$, is determined by the sequence depth, $N_t$, and the frame rate as follows:

$$t_e = \frac{N_t}{r}. \quad (M2)$$

In the experiments presented in the present example, $N_t$ ranges from 12 to 100 frames.

Supplementary Materials

Supplementary Note 1: Two-view image registration of the single-shot photoluminescence lifetime imaging thermometry (SPLIT) system.

To conduct the image registration between the two views, an established procedure was used to calibrate the single-shot photoluminescence lifetime imaging thermometry (SPLIT) system. In particular, a static upconverting nanoparticles (UCNPs) target was imaged by the single-shot photoluminescence lifetime imaging thermometry (SPLIT) system to form View 1 and View 2. No optical shearing was performed in the recording of View 2. The projective transformation was then quantified by using the registration estimator toolbox in MATLAB R2019b, which supplied a feature-based registration operator to automatically detect distinct local features such as sharp corners, blobs, or regions of images. The transformation matrix $P_t$ is defined as follows:

$$P_t = \begin{bmatrix} s_x\cos\theta & -s_x\sin\theta & l_x \\ s_y\sin\theta & s_y\cos\theta & l_y \\ 0 & 0 & 1 \end{bmatrix}, \quad (S1)$$

Here $s_x$ and $s_y$ are the scaling factors in the x-direction and the y-direction. $l_x$ and $l_y$ represent translation factors in the x-direction and the y-direction. Each pixel in View 1 with a homogeneous coordinate [u v 1] is transformed to the corresponding point [$u_c$ $v_c$ 1] as follows:

$$[u_c v_c 1]^T = P_t[u v 1]^T. \quad (S2)$$

In practice, $P_t$ was computed by using the static letter "A" pattern. FIGS. 5A, 5B show the acquired images in View 1 and View 2. The co-registered View 1 image (FIG. 5C) and the View 2 image were used for image reconstruction by single-shot photoluminescence lifetime imaging thermometry (SPLIT).

Supplementary Note 2: Derivation of the reconstruction by single-shot photoluminescence lifetime imaging thermometry (SPLIT).

In image reconstruction, the datacube of the dynamic scene is recovered by solving the minimization problem aided by regularizers. In particular, the inverse problem (Relation 2) is first written as follows:

$$\hat{I} = \underset{I,v,u,w \in A}{\operatorname{argmin}} \left\{ \frac{1}{2}\|Tv - E\|_2^2 + R(u) + I_+(w) \right\} \quad (S3)$$

$$\text{s.t. } v = MI, \, u = I, \, w = I,$$

u, and w are primal variables. A is the set of possible solutions in compliance with the spatial constraint, which is generated by binarizing the image $E_1$ in View 1 with an appropriate intensity threshold that is determined by the Otsu's method. Then, Relation $S_3$ is further written in the augmented Lagrangian arguments as follows:

$$\hat{I} = \underset{I,v,u,w \in A}{\operatorname{argmin}} \left\{ \frac{1}{2}\|Tv - E\|_2^2 + R(u) + I_+(w) + \right. \quad (S4)$$

$$\left. \frac{\mu_1}{2}\left\|MI - v + \frac{\gamma_1}{\mu_1}\right\|_2^2 + \frac{\mu_2}{2}\left\|I - u + \frac{\gamma_2}{\mu_2}\right\|_2^2 + \frac{\mu_3}{2}\left\|I - w + \frac{\gamma_3}{\mu_3}\right\|_2^2 \right\}.$$

$\gamma_1$, $\gamma_2$, and $\gamma_3$ are dual variables. $\mu_1$, $\mu_2$, and $\mu_3$ are penalty parameters The block-matching and 3D filtering (BM3D) is used as the plug-and-play (PnP) denoiser in the implicit regularizer $R(\cdot)$. The ramp function[12] is used in the non-negative indicator function $I_+(\cdot)$.

To retrieve the dynamic scene, primal variables were sequentially updated, estimated solution $I^{k+1}$ (k denotes the iteration time), and penalty parameters, as following five steps.

Step 1: update primal variables v, u, and w as follows:

$$v^{k+1} = \left(T^T \cdot T + \mu_1^k D\right)^{-1} \cdot \left(T^T E + \mu_1^k MI^k + \gamma_1^k\right), \quad (S5)$$

$$u^{k+1} = D_{BM3D}\left(I^k + \frac{\gamma_2^k}{\mu_2^k}\right), \text{ and}$$

$$w^{k+1} = \max\left\{0, I^k + \frac{\gamma_3^k}{\mu_3^k}\right\}.$$

D is the identity matrix. $D_{BM3D}(\cdot)$ stands for the block-matching and 3D filtering (BM3D) filtering.

Step 2: update the estimated datacube of the dynamic scene I(x, y, t) as follows:

$$I^{k+1} = \left(\mu_1^k M^T \cdot M \cdot D + \mu_2^k D + \mu_3^k D\right)^{-1} \quad (S6)$$

$$\left[\mu_1^k M^T\left(v^{k+1} - \frac{\gamma_1^k}{\mu_1^k}\right) + \mu_2^k\left(u^{k+1} - \frac{\gamma_2^k}{\mu_2^k}\right) + \mu_3^k\left(w^{k+1} - \frac{\gamma_3^k}{\mu_3^k}\right)\right].$$

Step 3: update the penalty parameters $\mu_1$, $\mu_2$, and $\mu_3$ as follows:

$$\mu_i^{k+1} = \begin{cases} \varphi\mu_i^k, & \text{if } p > \sigma q \\ \frac{\mu_i^k}{\varphi}, & \text{if } \sigma p < q \, (i = 1, 2, 3) \\ \mu_i^k, & \text{otherwise} \end{cases} \quad (S7)$$

Here, $p = \|I^{k+1} - v^{k+1}\|_2$ is the primal residual, and $q = \mu_i^k\|I^{k+1} - I^k\|_2$ is the dual residual. $\varphi(\varphi > 1)$ is the balancing factor, and $\sigma(\sigma > 1)$ is the residual tolerance[13]. In the experiments, $\varphi = 1.1$ and $\sigma = 1.5$ were selected.

k+1 in

Step 4: judge the relative change in results and the parameters $\mu_1^{k+1}$, $\mu_2^{k+1}$, and $\mu_3^{k+1}$ in adjacent iterations as follows:

$$\text{if } \eta = \frac{\|I^{k+1} - I^k\|_2}{\|I^{k+1}\|_2} < \rho \text{ and } \mu_i^{k+1} = \mu_i^k (i = 1, 2, 3). \quad (S8)$$

Here, $\rho(0 < \rho < 10^{-3})$ is the pre-set tolerance value.

Step 5: if the convergence is unmet, update dual variables $\gamma_1$, $\gamma_2$, and $\gamma_3$ as follows:

$$\gamma_1^{k+1} = \gamma_1^k + \mu_1^{k+1}(MI^{k+1} - v^{k+1}),$$

$$\gamma_2^{k+1} = \gamma_2^k + \mu_2^{k+1}(I^{k+1} - u^{k+1}), \text{ and} \quad (S9)$$

$$\gamma_3^{k+1} = \gamma_3^k + \mu_3^{k+1}(I^{k+1} - w^{k+1}).$$

These steps are repeated until both criteria in Step 4 are satisfied. The image reconstruction recovers the datacube of the dynamic scene.

Supplementary Note 3: Simulation results of the dual-view plug-and-play alternating direction method of multipliers (PnP-ADMM).

To test the proposed dual-view plug-and-play alternating direction method of multipliers (PnP-ADMM), a simulated dynamic scene—the intensity decay of a static Shepp-Logan phantom, was reconstructed. This dynamic scene contained 12 frames, each with a size of 200×200 pixels. The intensity in each frame is determined by a single exponential function of $I_{n_t} = \exp(-n_t/2)$, where $n_t = 1, \ldots, 12$ denotes the frame index.

Then, this dynamic scene was fed into single-shot photoluminescence lifetime imaging thermometry (SPLIT)'s forward model (Relation 1 hereinabove) to generate $E_1$ and $E_2$. To mimic the experimental conditions, Gaussian noise (0.01 variance and 0 mean value) was added into $E_1$ and $E_2$. Finally, these two images were input into the dual-view plug-and-play alternating direction method of multipliers (PnP-ADMM) to retrieve the datacube of this dynamic scene. The reconstructed frames and ground truth frames are compared side by side in FIG. 6A. The averaged peak signal-to-noise ratio and the averaged structural similarity index over all reconstructed images were calculated to be 34.6 dB and 0.96, respectively. The reconstructed three local features in Frame 1 are compared to their ground truths (FIG. 6B). FIG. 6C presents the reconstructed normalized intensity versus time, which has a good agreement with the pre-set intensity decay (black dashed line).

Supplementary Note 4: Details on the relationship between temperature and lifetime The normalized area integration method is commonly used for calculating lifetime based on pulsed excitation. Photoluminescence lifetime of upconverting nanoparticles (UCNPs) following pulsed excitation can be expressed by $$L_t = \int_0^\infty f(t) * g(t) dt. \quad (S10)$$

$$f(t) = \frac{1}{\sqrt{\pi} t_w} \exp\left(-\frac{t^2}{t_w^2}\right)$$

represents the Gaussian excitation pulse with a pulse width of $t_w$. $g(t) = \Sigma \varepsilon_i \exp(-t/\tau_i)$ is used to represent the photoluminescence with multiple exponential decays, each of which has a lifetime $\tau_i$. $\varepsilon_i$ represents the proportion of each exponential decays. "*" denotes convolution. The calculation result is given as follows:

$$L_t = \sum \varepsilon_i \tau_i \exp\left(\frac{t_w^2}{4\tau_i^2}\right). \quad (S11)$$

When $t_w$ approaches to zero, which denotes an ultrashort pulse, the integration area has as follows:

$$L_t = \Sigma \varepsilon_i \tau_i. \quad (S12)$$

Following the established theory, the photoluminescence lifetime was defined as $\tau = \Sigma \varepsilon_i \tau_i / \Sigma \varepsilon_i$. Considering that $\Sigma \varepsilon_i = 1$, $\tau = L_t$.

The lifetime is linearly linked to the temperature as follows:

$$T = c_t + \frac{L_t}{S_a}. \quad (S13)$$

$S_a$ denotes the absolute temperature sensitivity, and $c_t$ denotes a constant. This derivation produces Relation 3 hereinabove.

In the single-shot photoluminescence lifetime imaging thermometry (SPLIT) system, a continuous-wave laser and an optical chopper to generate excitation pulses were used. Although the chopper blade's slit width could approach zero for generating an ultrashort pulse duration, it demands a high laser power. Thus, a finite pulse width needs to be chosen to provide sufficient signal-to-noise ratios in measurement while still maintaining accurate lifetime calculation. In practice, $t_w = 50$ μs, was selected, which was comparable to the values used in the literature. The calculation also showed that this pulse width induced a less than 0.3% calculation error for the 5.6-mm-thick-shell upconverting nanoparticles (UCNPs) that were mainly used in the experiments. Thus, 50-μs pulse width allowed the single-shot photoluminescence lifetime imaging thermometry (SPLIT) system to produce accurate temperature mapping results.

Supplementary Note 5: Preparation and characterization of upconverting nanoparticles (UCNPs).

Core/shell $NaGdF_4$: 2 mol % $Er^{3+}$, 20 mol % $Yb^{3+}$/ $NaGdF_4$ upconverting nanoparticles (UCNPs) were synthesized via the previously reported thermal decomposition method, with minor modifications to the synthesis procedure. Core precursors were prepared by mixing 0.025 mmol of $Er_2O_3$ (REacton 99.99%), 0.250 mmol $Yb_2O_3$ (REacton 99.99+%), and 0.975 mmol $Gd_2O_3$ (REacton 99.99+%) with 5 mL trifluoroacetic acid (99%) and 5 mL of distilled water in a 50 mL three-neck round bottom flask. Shell precursors were prepared separately by mixing 1.5 mmol of $Gd_2O_3$ with 5 mL of trifluoroacetic acid and 5 ml of distilled water in a 50 mL three-neck round bottom flask. Mixtures were refluxed under vigorous stirring at 80° C. until each solution turned from turbid to clear, at which point the temperature was decreased to 60° C. to slowly evaporate the excess trifluoroacetic acid and water. All precursors were obtained as solid dried materials and were used for the upconverting nanoparticles (UCNPs) synthesis without further purification. All materials involved in the precursor synthesis (obtained from Alfa Aesar) were used without further purification.

The first step was to synthesize the core UCNPs. An initial mixture of 12.5 mL each of oleic acid (OA; 90%, Alfa Aesar) and 1-octadecene (ODE; 90%, Alfa Aesar) was prepared in a 100 mL three-neck round bottom flask (Solution A). Aside, 2.5 mmol of sodium trifluoroacetate (98%, Alfa Aesar) was added to the dried core precursor together with 7.5 mL each of oleic acid and 1-octadecene (Solution B). Both Solutions A and B were degassed at 145° C. under vacuum with magnetic stirring for 30 minutes. After degassing, Solution A was placed under an inert Ar atmosphere and the temperature was slowly raised to 315° C. Solution B was then injected into the reaction vessel containing Solution A using a syringe and pump system (Harvard Apparatus, Pump 11 Elite) at a 1.5 mL/min injection rate. The mixture was left at 315° C. under vigorous stirring for 60 minutes. The synthesized core upconverting nanoparticles (UCNPs) were stored in Falcon centrifuge tubes (50 mL) under Ar for the further shelling step. Due to the evaporation of impurities in starting materials, for example OA and ODE) and reaction byproducts, as well as minor losses accrued from intermediate steps of liquid handling, the final volume of the core mixture was around 36 mL.

In the second step, core/shell upconverting nanoparticles (UCNPs) of different shell thicknesses were prepared by epitaxial growth of the shell on the preformed cores via a multi-step hot-injection approach. First, Solution A was prepared by mixing approximately 1.5 mmol of core upconverting nanoparticles (UCNPs) (~21.6 mL) in a 100 mL three-neck round bottom flask together with 9.2 mL each of OA and ODE. Separately, Solution B was prepared by mixing 3 mmol of gadolinium trifluoroacetate (shelling) precursors with 3 mmol of sodium trifluoroacetate, and 10.5 mL each of OA and ODE. Both solutions were degassed under vacuum and magnetic stirring at 110° C. for 30 minutes. After degassing, Solution A was back-filled with argon gas and the temperature was raised to 315° C. Solution B was then injected into the reaction vessel containing Solution A using a syringe and pump system at a 0.75 mL/min injection rate in three steps. After each about 7 mL injection step, the mixture was allowed to react for 60 minutes. A portion of core/shell upconverting nanoparticles (UCNPs) would be extracted before the next injection step: 15.6 mL after the first injection step for core/shell upconverting nanoparticles (UCNPs) with a 1.9 nm-thick shell and 19.2 mL after the second injection step for core/shell upconverting nanoparticles (UCNPs) with a 3.5 nm-thick shell. Extractions were allowed to cool down to room temperature before transfer from glass syringe to Falcon centrifuge tube for subsequent washing. After the final injection step and a total of 180 minutes of reaction, the mixture (core/shell upconverting nanoparticles (UCNPs) with a 5.6 nm-thick shell) was cooled to room temperature under argon gas and magnetic stirring. All core/shell upconverting nanoparticles (UCNPs) were precipitated with ethanol and washed three times with hexane/acetone (¼ v/v in each case), followed by centrifugation (with 5400 relative centrifugal force). Finally, all upconverting nanoparticles (UCNPs) were re-dispersed in hexane for further structural and optical characterization.

Structural Characterization

The morphology and size distribution of the core/shell upconverting nanoparticles (UCNPs) were investigated by transmission electron microscopy (TEM, Philips, Tecnai 12). The particle size was determined from TEM images using ImageJ software with a minimum set size of 280 individual upconverting nanoparticles (UCNPs) per sample. The results are shown in FIG. 2A. The crystallinity and phase of the core-only and core/shell upconverting nanoparticles (UCNPs) were determined via X-ray powder diffraction (XRD) analysis using a diffractometer (Bruker, D8 Advance) with CuKα radiation (FIG. 7). The peaks in measured XRD spectra match the reference tabulated data (PDF #01-080-8787). Along with the TEM images (FIG. 2A), this result ensured that the fabricated upconverting nanoparticles (UCNPs) are of the hexagonal crystal phase.

Supplementary Note 6: characterization of sensitivity of single-shot photoluminescence lifetime imaging thermometry (SPLIT) system.

Figure 8B:
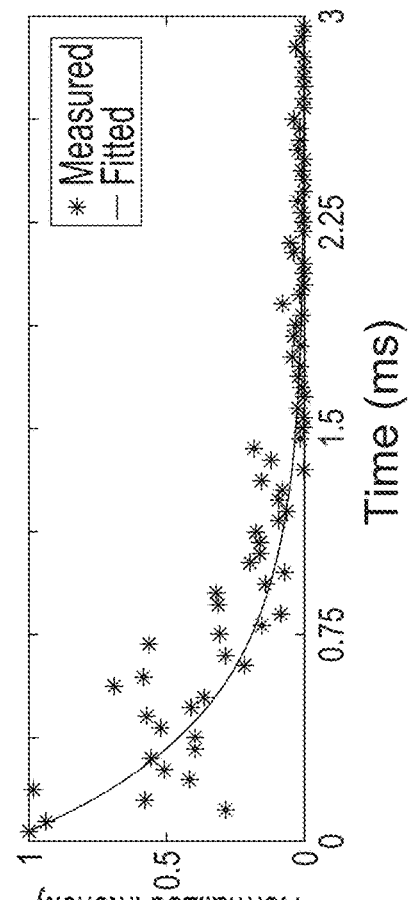
FIG. 8B shows the normalized intensity as a function of time with a fitting curve.
Figure 8A:
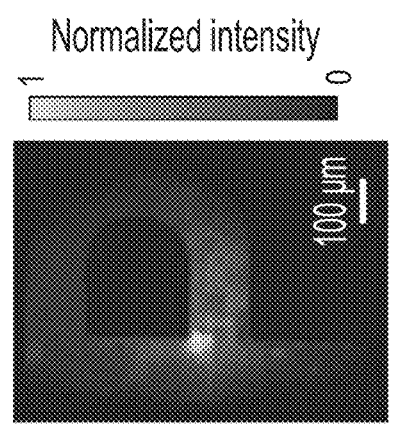
FIG. 8A shows temporally integrated reconstructed image at the excitation laser power density of 0.06 $W/mm^2$.

To test the sensitivity of single-shot photoluminescence lifetime imaging thermometry (SPLIT) system, the reconstructed image quality was monitored while decreasing the laser power. The detection sensitivity of the single-shot photoluminescence lifetime imaging thermometry (SPLIT) system was characterized by imaging photoluminescence intensity decay with various power densities (FIG. 8). Transparency of the letter "P" covered the sample of upconverting nanoparticles (UCNPs) with a shell thickness of 5.6 nm. The laser power density was varied from 0.4 to 0.04 W/mm². All other experimental parameters, such as exposure time, camera gain, and temperature, were kept the same. The quality of reconstructed images kept degrading with decreased laser power density until partially losing spatial structure below 0.06 W/mm². In addition, lower signal-to-noise ratios in measurements deteriorate the image reconstruction, manifested by the increase in noise levels in the intensity decay curves and the deviation of the calculated photoluminescence lifetime from the correct values. Thus, the sensitivity of single-shot photoluminescence lifetime imaging thermometry (SPLIT) under single-shot imaging for this upconverting nanoparticle (UCNP) sample was quantified to be 0.06 W/mm².

Supplementary Note 7: Measurement of photoluminescence lifetimes of upconverting nanoparticles (UCNPs) using time-correlated single-photon counting (TCSPC) method.

Figure 9:
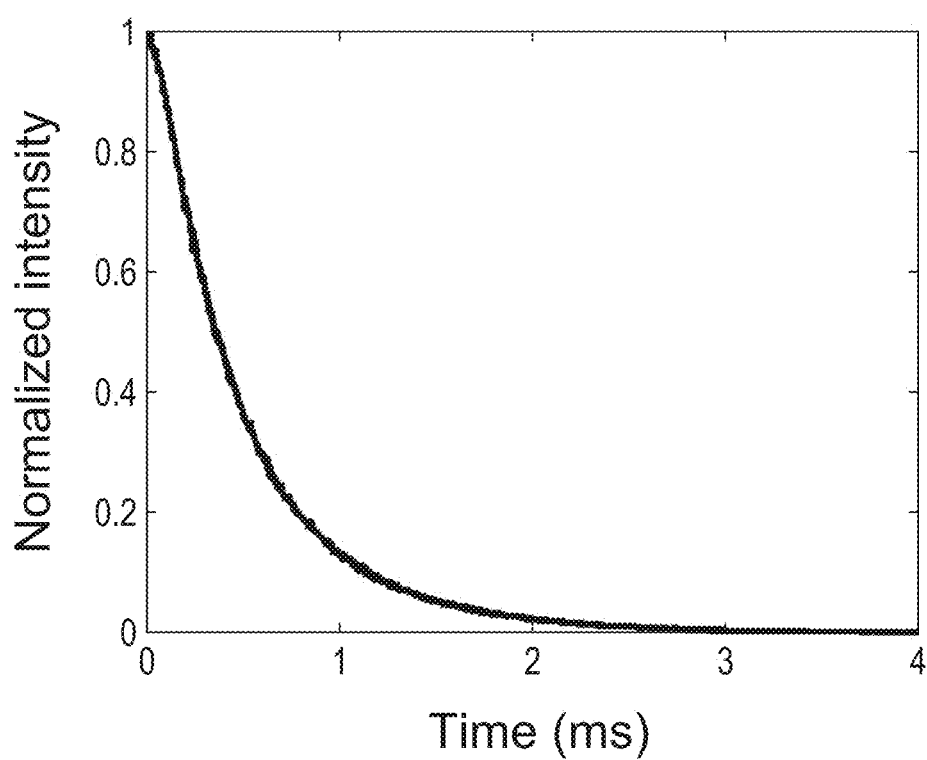
FIG. 9 shows a measurement of the green upconversion emission lifetime of the 5.6 nm-thick-shell upconverting nanoparticles (UCNPs) using time-correlated single-photon counting (TCSPC)

To ascertain the results, the standard time-correlated single-photon counting (TCSPC) method (Edinburgh Instruments, FLS980, 70-μs excitation pulse) was used to measure photoluminescence decay of the 5.6 nm-thick upconverting nanoparticles (UCNPs) dispersed in hexane. The measured intensity decay curve is shown in FIG. 9. Lifetime values acquired from the single-shot photoluminescence lifetime imaging thermometry (SPLIT) system and time-correlated single-photon counting (TCSPC) measurements yielded a 6.9% mismatch. This difference is attributed to different environments in which upconverting nanoparticles (UCNPs) were measured (dried powder for the single-shot photoluminescence lifetime imaging thermometry (SPLIT) system and solution for time-correlated single-photon counting (TCSPC), different excitation pulse widths (50-μs for the single-shot photoluminescence lifetime imaging thermometry (SPLIT) system and 70-μs for time-correlated single-photon counting (TCSPC), and different instrumental responses.

Supplementary Note 8: Comparison of reconstructed image quality.

Figure 10A:
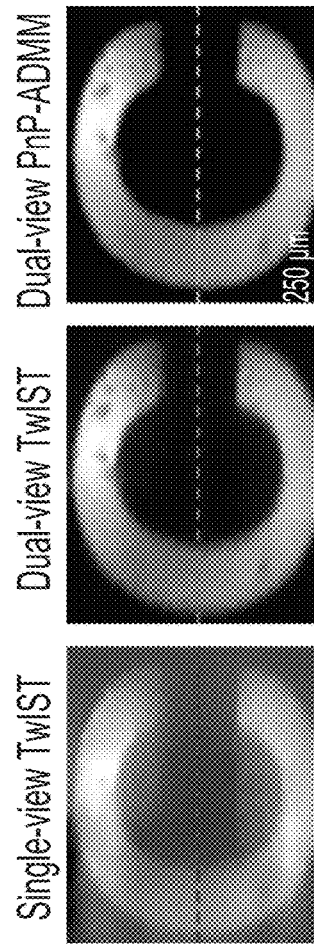
FIG. 10A shows letter "C" reconstructed by using the single-view two-step iterative thresholding/shrinkage (TwIST) method, dual-view two-step iterative thresholding/shrinkage (TwIST) method, and dual-view plug-and-play alternating direction method of multipliers (PnP-ADMM) method, respectively.
Figure 10B:
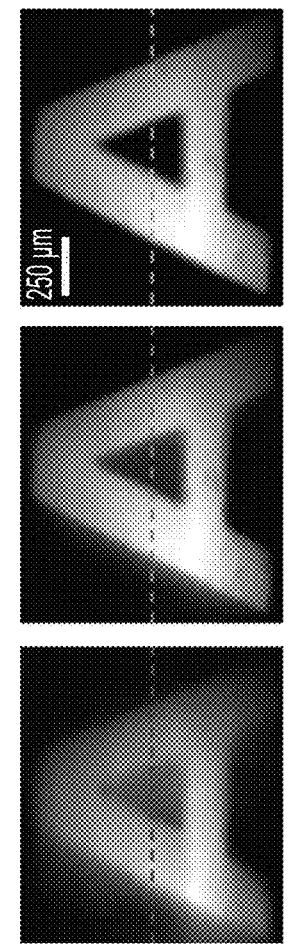
FIG. 10B ad FIG. 10, like FIG. 10A, for letters "A" and "N"
Figure 10C:
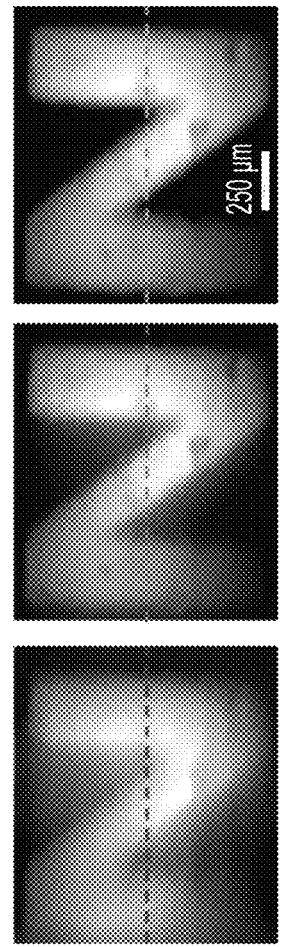
Figure 10D:
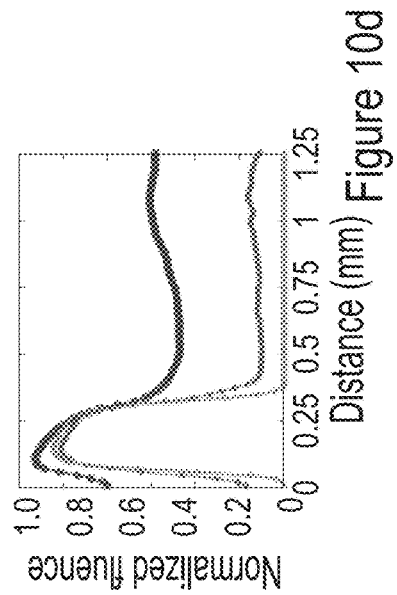
FIG. 10D shows a comparison of the selected line profiles of the reconstructed images of letter "C"
Figure 10E:
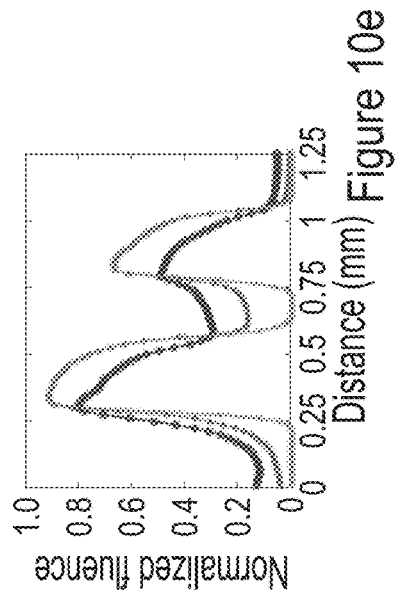
FIG. 10E and FIG. 10GF, like FIG. 10D for letters "A" and "N".
Figure 10F:
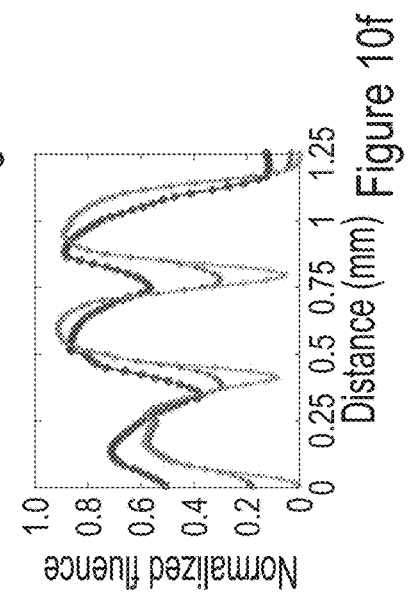

To quantitatively demonstrate the dual-view plug-and-play alternating direction method of multipliers (PnP-ADMM) employed in reconstruction by single-shot photoluminescence lifetime imaging thermometry (SPLIT), it was compared with two other algorithms dominantly used in existing streak-camera-based single-shot ultrafast imaging—the single-view two-step iterative thresholding/shrinkage (TwIST) method and the dual-view two-step iterative thresholding/shrinkage (TwIST) method. Specifically, the experimental data of the upconverting nanoparticles (UCNPs) with shell thicknesses of 1.9 nm, 3.5 nm, and 5.6 nm, covered by transparencies of letters "C", "A", and "N", respectively, was used. Both View 1 and View 2 were used for the dual-view two-step iterative thresholding/shrinkage (TwIST) method and the dual-view plug-and-play alternating direction method of multipliers (PnP-ADMM). Only View 2 was used for the single-view two-step iterative thresholding/shrinkage (TwIST) method. All the reconstructed datacubes had the same size. FIGS. 10A-10C show the time-integrated images by projecting datacubes reconstructed by the three algorithms along the time axis. Among them, the result from the dual-view plug-and-play alternating direction method of multipliers (PnP-ADMM) is duplicated from FIG. 2F to better illustrate this comparison. One line from each letter was selected and the profile compared in FIGS. 10D-10F. From these results, the single-view two-step iterative thresholding/shrinkage (TwIST) method gives the worst edge contrasts of 0.41 for "C", 0.88 for "A", 0.76 for "N". The dual-view two-step iterative thresholding/shrinkage (TwIST) method improves the contrast to 0.82, 0.99, and 0.93, respectively. The dual-view plug-and-play alternating direction method of multipliers (PnP-ADMM) gives the best result, producing edge contrasts of 1 for all three cases.

Figure 10G:
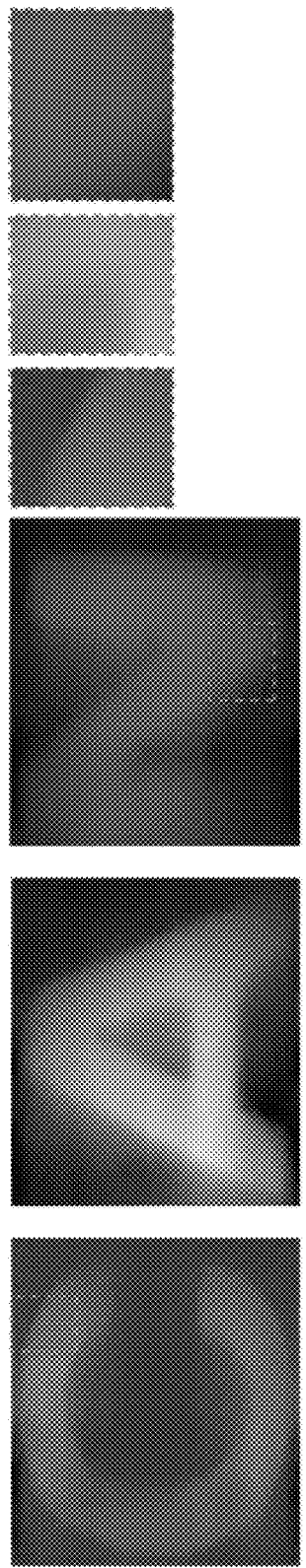
Figure 10H:
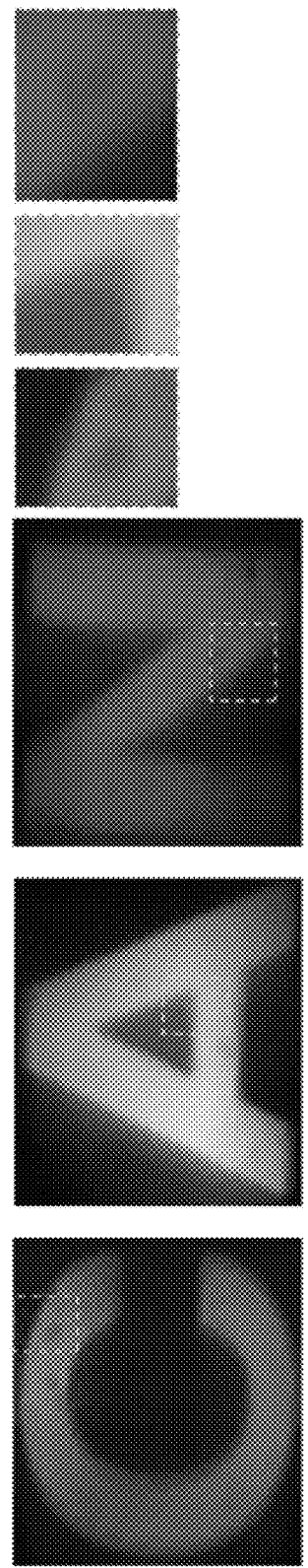
Figure 10I:
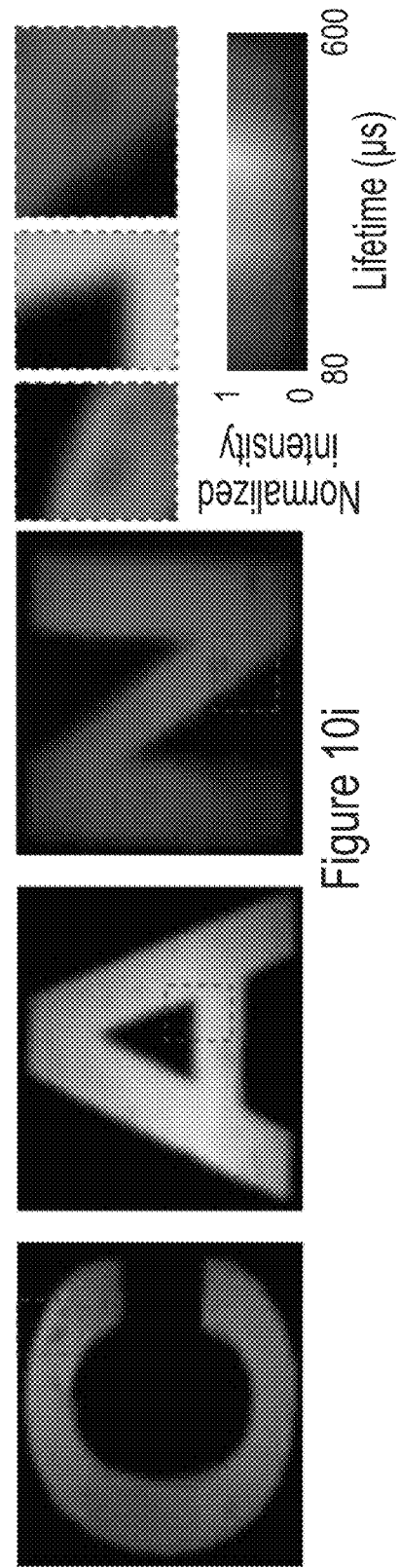

The better quality in the reconstructed images translated to higher accuracy in lifetime quantification. FIGS. 10G-10I show 2D lifetime maps of these samples with zoom-in-views of three local areas. Both the single-view and dual-view two-step iterative thresholding/shrinkage (TwIST) methods yield artifacts, manifesting as false lifetime values on pixels in the background. In contrast, the dual-view-plug-and-play alternating direction method of multipliers (PnP-ADMM) eliminates these artifacts with a clean background. Meanwhile, in the selected local areas of letters "C" and "N" (insets in FIGS. 10G-10I), single-view two-step iterative thresholding/shrinkage (TwIST) method completely wipes out the features induced by the non-uniform distribution of the UCNPs. In contrast, both dual-view TwIST and dual-view plug-and-play alternating direction method of multipliers (PnP-ADMM) preserve these features. Finally, benefitting from the denoising capability of the dual-view plug-and-play alternating direction method of multipliers (PnP-ADMM) the noise level in the intensity decay curves as a function of time reduces by 4.6× and 2.5× compared to those of the single-view two-step iterative thresholding/shrinkage (TwIST) method and dual-view TwIST two-step iterative thresholding/shrinkage (TwIST) method, which contributes to a more accurate lifetime calculation using Eqs. (S10)-(S12).

Supplementary Note 9: Determination of the absolute temperature sensitivities, relative temperature sensitivities, and thermal uncertainty.

Both the absolute temperature sensitivity $S_a$ and the constant $c_t$ in Relation 3 are determined by using the curve fitting toolbox in Matlab. Using the data presented in FIG. 3 with linear fitting, $S_a=-1.90$ µs/° C. and $c_t=278°$ C. for green emission and $S_a=-2.40$ µs/° C. and $c_t=210°$ C. for red emission were quantified.

Moreover, the relative temperature sensitivity can be as follows:

$$S_r = \frac{|S_a|}{\tau}. \quad \text{(S14)}$$

Figure 11:
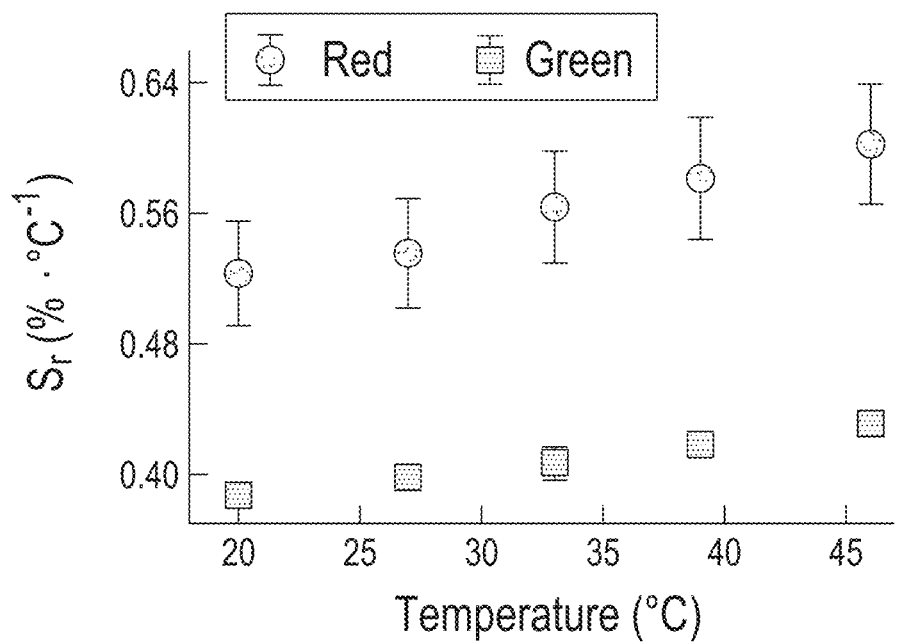
FIG. 11 shows quantification of relative temperature sensitivities of green and red upconversion emissions of the core/shell NaGdF$_4$: Er$^{3+}$, Yb$^{3+}$/NaGdF$_4$ upconverting nanoparticles (UCNPs) with a 5.6 nm-thick shell. Error bar: standard deviation.

Using the data shown in FIG. 3e, $S_r$ in the pre-set temperature range were quantified to be 0.39-0.43%·° C.$^{-1}$ for green emission and 0.52-0.60%·° C.$^{-1}$ for red emission (FIG. 11).

Finally, the thermal uncertainty in single-shot photoluminescence lifetime imaging thermometry (SPLIT) is calculated as follows:

$$\delta T = \frac{1}{S_r} \times \frac{\delta \tau}{\tau}, \quad \text{(S15)}$$

where $\delta\tau$ represents the uncertainty in the measured lifetimes. Relation (S15) shows that $\delta T$ depends on both the UCNPs' performance (quantified by the relative sensitivity, $S_r$) and experimental setup (that limits the normalized fluctuation of lifetimes, $$\frac{\delta\tau}{\tau}\bigg).$$

$\delta\tau$ was characterized by repeating measurements using the single-shot photoluminescence lifetime imaging thermometry (SPLIT) system under the same experimental conditions. Specifically, using the sample of the 5.6 nm shell thickness upconverting nanoparticles (UCNPs) at 20° C., the 2D lifetime measurements were repeated 60 times using the excitation power density of 0.4 W/mm$^2$ and 0.06 W/mm$^2$, respectively These measurements produced $\delta\tau$ of 1.4-2.7 µs for the green emission and 2.2-4.0 µs for the red emission, respectively. With known values of $|S_a|$ and by using Relation (S15), single-shot photoluminescence lifetime imaging thermometry (SPLIT)'s thermal uncertainty was calculated to be 0.7-1.4° C. for the green emission and 0.9-1.7° C. for the red emission.

Supplementary Note 10: characterization of imaging depth of single-shot photoluminescence lifetime imaging thermometry (SPLIT) in biological environment.

The upconverting nanoparticle (UCNP) sample with the shell thickness of 5.6 nm was covered by lift-out grids (Ted Pella, 460-2031-S), in which the features of the letter "O" with a triangular shape on the bottom and the letter "m" was selected. Then, fresh chicken tissue with a thickness of 0.25, 0.5, 0.65, 0.75, 1.0 mm was used to cover the sample (FIG. 12A). The single-shot photoluminescence lifetime imaging thermometry (SPLIT) system captured the photoluminescence decay at 20 kfps. The reconstructed datacubes were projected to the x-y plane (FIGS. 12B, 12C).

Figures 13A, 13B:
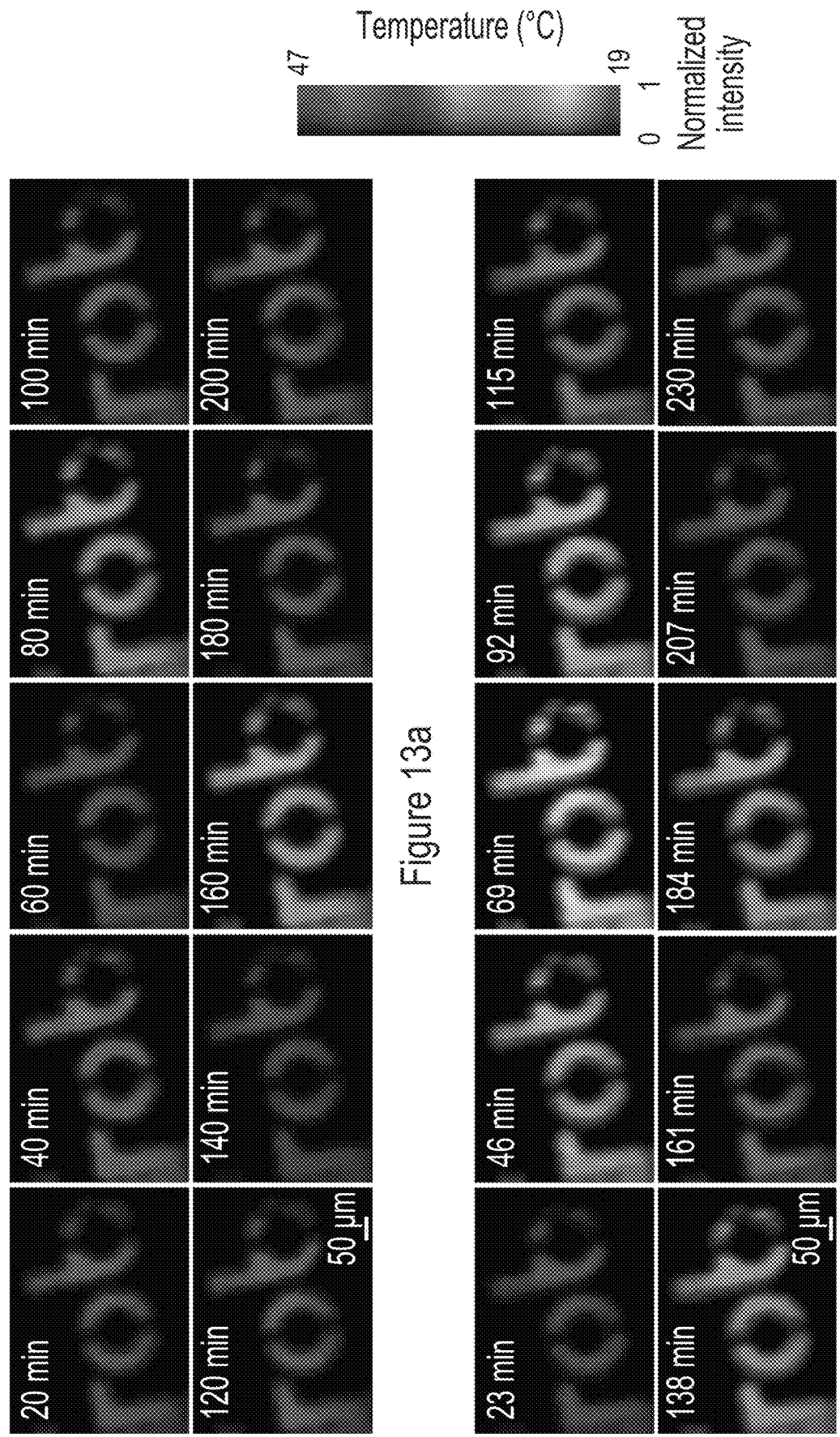
FIG. 13 show longitudinal temperature monitoring using green in FIG. 13A and red in FIG. 13B luminescence emissions from the 5.6 nm-thick upconverting nanoparticles (UCNPs) covered by a transmissive mask of letters "rob"

The image without chicken tissue, which is referred to as the thickness of "0 mm", is also included for comparison. With the increased depth, the image intensity and contrast gradually approach zero. FIG. 12D depicts the normalized intensity profiles across the white dashed line as shown in the first panel of FIG. 12B. The experimental result was fitted using Beer's law 18 with an extinction coefficient of 0.26 cm$^{-1}$. At the depth of 0.65 mm the triangular feature and the letter "m" cannot be distinguished. Using a similar experimental procedure, imaging depth of single-shot photoluminescence lifetime imaging thermometry (SPLIT) for red emission (FIGS. 12C, 12E) was characterized. The decay intensity of red emission was fitted with Beer's law with an extinction coefficient of 0.18 cm$^{-1}$. The spatial features vanished at the depth of 0.75 mm. These results show that the red emission has, as expected, a greater imaging depth than the green upconversion counterpart. These results also show that good contrast can be maintained by using a chicken tissue of 0.5 mm thickness, which was selected for the longitudinal temperature monitoring experiments (FIG. 13).

Figure 14A:
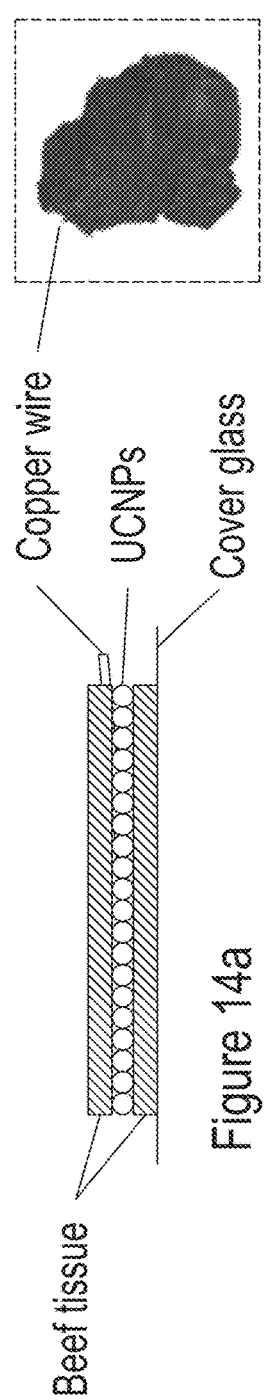
FIG. 14A shows sample preparation.
Figure 14B:
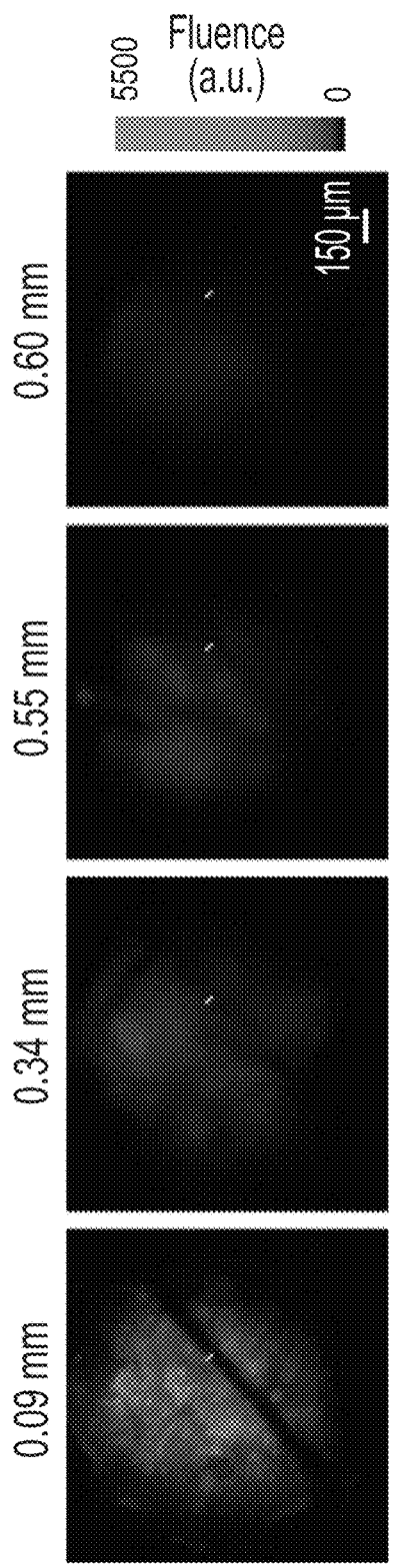
FIG. 14 shows demonstration of single-shot photoluminescence lifetime imaging thermometry (SPLIT) with a fresh beef tissue phantom.
FIG. 14C shows same as FIG. 14B for red emission.
FIG. 14D shows cross-sections of a selected spatial feature, marked by the solid line in FIG. 14B, for various depths.
FIG. 14E shows same as FIG. 14D for red emission.
FIG. 14F shows normalized fluence versus tissue thickness for green and red emission fitted using Beer's law.
FIG. 14G shows lifetimes as the function of the thickness for green emission (circles; the mean value being plotted in solid line) and red emission (diamonds; the mean value being plotted as the dashed line), the error bar corresponding to standard deviation, FIG. 14H showing the decay of normalized average intensity at the depth of 0.09 mm for the green emission and FIG. 14I showing the decay of normalized average intensity at the depth of 0.09 mm for the red emission.
Figure 14C:
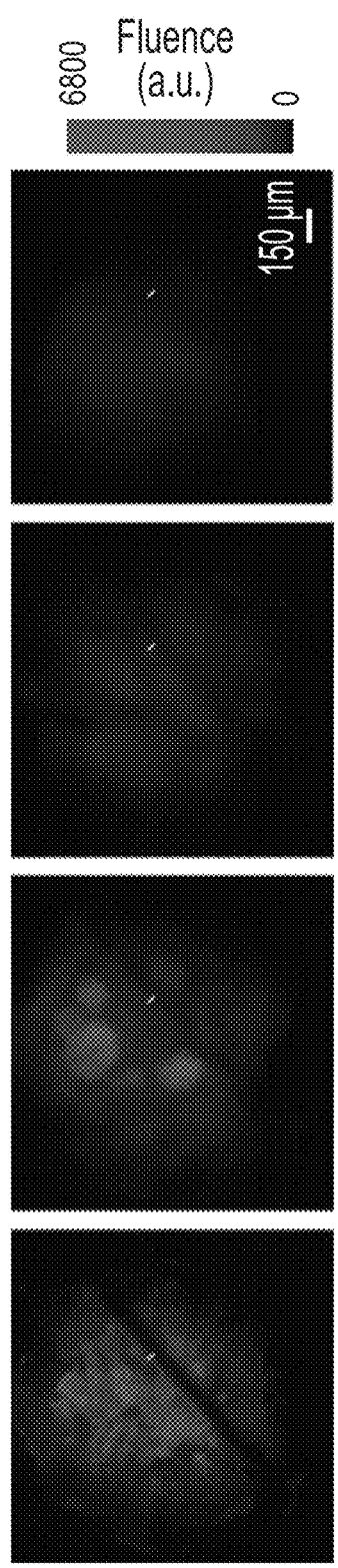

To test single-shot photoluminescence lifetime imaging thermometry (SPLIT) using a scattering medium with the presence of both water and blood, the Upconverting nanoparticles (UCNPs) with the shell thickness of 5.6 nm were injected into a piece of fresh beef tissue, where a 90 µm-diameter copper wire was also inserted at the depth of 0.09 mm as a spatial feature (FIG. 14A). To evaluate the imaging ability single-shot photoluminescence lifetime imaging thermometry (SPLIT) at different depths, this phantom was covered by different additional beef slices, so that the thickness from the surface to the copper wire was 0.34 mm, 0.55 mm, and 0.60 mm. The single-shot photoluminescence lifetime imaging thermometry (SPLIT) system performed photoluminescence lifetime imaging (PLI) at 20 kfps. For both the green and the red emissions, the reconstructed datacubes with the different beef thicknesses were projected temporally, as shown in FIGS. 14B, 14C. Furthermore, the profile of a selected local edge feature of the inserted copper wire was plotted under the different thicknesses, as shown in FIGS. 14D, 14E. The contrast of these edge profiles were calculated. For the green emission, the values are 0.78, 0.27, 0.26, and 0.09 for the four selected curves. As for the red emission, these values are 0.80, 0.38, 0.33, and 0.09. Moreover, these experimental results were fitted using Beer's law[18] with an extinction coefficient of 0.33 cm$^{-1}$ for the red emission and 0.65 cm$^{-1}$ for the green emission FIG. 14F, which are greater than their counterpart of the chicken tissue of 0.18 cm$^{-1}$ and 0.26 cm$^{-1}$. Because of its longer wavelength, the red emission has weaker scattering and weaker absorption by blood, which led to a better penetration effect over the green emission for both types of scattering media. Finally, the photoluminescence lifetimes was analyzed for different thicknesses, and the results are shown in FIG. 14G. The measured photoluminescence lifetimes for both emissions do not depend on the tissue thickness and hence excitation light intensity under the experimental conditions of the presently reported example. Lower excitation intensity, however, reduced the signal-to-noise ratio of the captured snapshots, which transfers to a larger standard deviation.

Supplementary Note 11: preparation of the single-layer onion cells doped with upconverting nanoparticles (UCNPs).

For the onion cell experiments, upconverting nanoparticles (UCNPs) with a 5.6 nm-thick shell were first transferred to water via ligand exchange with citrate molecules. In a typical procedure, citrate-coated upconverting nanoparticles (UCNPs) were prepared by mixing 50 mg of oleate-capped upconverting nanoparticles (UCNPs) dispersed in 25 ml of hexane and 25 mL of 0.2 M trisodium citrate (99%; Alfa Aesar) solution (pH 3-4) under vigorous stirring for 3 hours. The two-phase (aqueous/organic) mixture was then poured into the separatory funnel, and the aqueous phase containing the upconverting nanoparticles (UCNPs) was isolated. The upconverting nanoparticles (UCNPs) were precipitated with acetone (⅓ v/v) via centrifugation at 7500 rounds per minute (rpm) for 30 minutes. The obtained pellet was re-dispersed in 25 ml of 0.2 M trisodium citrate solution (pH 7-8) and left under stirring for an additional 2 hours. Upconverting nanoparticles (UCNPs) were then precipitated with acetone (⅓ v/v) via centrifugation at 7500 rpm for 30 minutes and washed twice with a mixture of water/acetone (⅓ v/v). The citrate-coated upconverting nanoparticles (UCNPs) were re-dispersed in distilled water.

The yellow household onion was used to peel single-layer sheets of onion cells, which were incubated in a solution of citrate-coated upconverting nanoparticles (UCNPs) (3 mg/ml) for 24 hours. After the incubation, single-layer onion cells were rinsed in distilled water and dried by gently tapping with a soft paper tissue, before being placed onto microscope slides for subsequent imaging experiments. Before lifetime imaging, the presence of upconverting nanoparticles (UCNPs) in single-layer onion cells was confirmed (FIG. 15A) with a bright-field microscope (Nikon, ECLIPSE Ti-S). In addition, a reference photoluminescence intensity image was taken by a custom-built confocal imaging platform (Photon Etc.), equipped with pulsed femtosecond Ti: Sapphire laser (Spectra-Physics, Mai Tai DeepSee). Samples were excited and imaged epi-fluorescently through a 20×/0.40 NA objective lens (Nikon, CFI60 TU Plan Epi ELWD). Photoluminescence intensity was recorded by a low-noise CCD camera (Princeton Instruments, Pixis100). The upconversion emission images of static onion cells (FIG. 15B) were obtained through raster scanning a 120× 120 pixel map, each of which has the size of 2 µm and the integration time 0.2 s per pixel. The total time to form one lifetime map was 48 minutes.

Supplementary Note 12: comparison between single-shot photoluminescence lifetime imaging thermometry (SPLIT) system and streak-camera-based modalities for 2D lifetime imaging.

To articulate the difference between single-shot photoluminescence lifetime imaging thermometry (SPLIT) and ultrafast imaging that used streak cameras, their technical specifications and applications are summarized in Supplementary Table 1 hereinbelow. To explain the details included in this table, the principles of streak cameras and compressed ultrafast photography (CUP) are first detailed; then, technical specifications and applications of the existing imaging modalities are summarized.

Figure 16B:
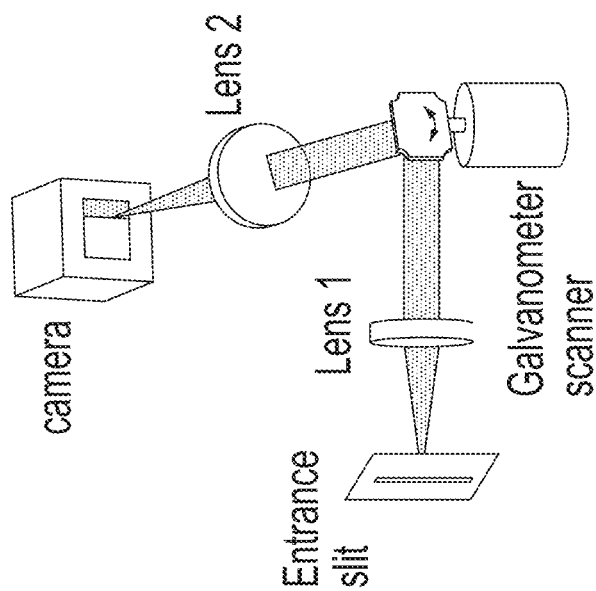
FIG. 16 show schematics of an optoelectronic streak camera (FIG. 16A) and a mechanical streak camera (FIG. 16B) in their conventional operations.
Figure 16A:
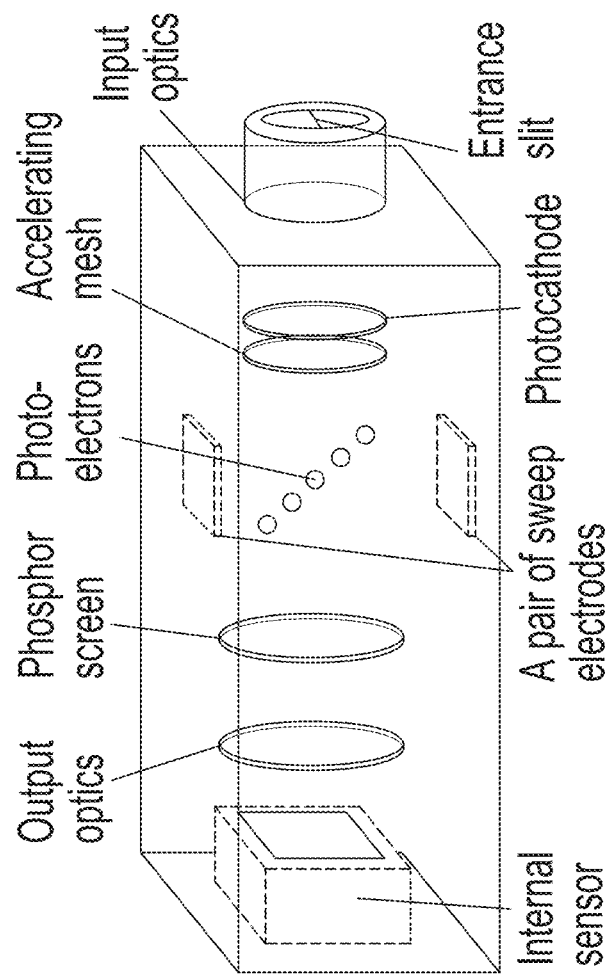

Streak cameras are highly suitable for 2D lifetime imaging. Typically, in operation, the field of view (FOV) of streak cameras is limited by an entrance slit with typical widths in a range between about 50 and about 100 µm. A sweeping unit deflects the time-of-arrival of the incident light signal along the axis perpendicular to the device's entrance slit. Depending on the mechanisms of the sweeping unit, streak cameras can be generally categorized into optoelectronic and mechanical types. In optoelectronic streak cameras (FIG. 16A), incident photons are first converted to photoelectrons by a photocathode. After acceleration, these photoelectrons are deflected by a time-varying voltage applied on a pair of sweep electrodes. Then, these photoelectrons are converted back to photons on a phosphor screen. Finally, the optical signal is imaged to an internal sensor. The optoelectronic streak camera can achieve a temporal resolution of up to 100 fs. Because of this ultrafast imaging ability, optoelectronic streak cameras have been used for imaging fluorescence that has lifetimes in the order of picoseconds and nanoseconds. However, due to the photon-to-photoelectron conversion by the photocathode, the quantum efficiency (QE) of the optoelectronic streak cameras is typically less than 15% for visible light. Besides, the space-charge effect in the electro-optic lens system imposes constraints in the spatial resolution, typically tens to hundreds of micrometers, and the dynamic range, for example less than 10 for certain femtosecond streak cameras. Both weaknesses severely limit the quality of acquired data.

Unlike optoelectronic streak cameras, a mechanical streak camera usually uses a rotating mirror, for example a galvanometer scanner or a polygon mirror, to deflect the light. Since the mechanical sweeping is much slower than the optoelectronic counterpart, this type of streak camera has tunable temporal resolutions from hundreds of nanoseconds to microseconds, which makes them highly suitable for lifetime imaging of luminescence processes on the order of microseconds and milliseconds, such as phosphorescence and parity forbidden 4f-4f transitions in lanthanide ions. Moreover, its all-optical data acquisition allows flexibly implementing many high-sensitivity cameras, for example electron-multiplying charged-coupled device (EMCCD) and scientific complementary metal oxide semiconductor (CMOS) cameras, whose QEs can be >90%, to obtain increased signal-to-noise ratios in measurements. The all-optical operation also avoids the space-charge effect, which enables optics-limited spatial resolution and high dynamic range, for example over 60,000, of the electron-multiplying charged-coupled device (EMCCD) camera used in the present discussion. Finally, the mechanical streak camera is considerably more cost-efficient than the optoelectronic streak camera. Therefore, mechanical streak cameras are more suitable for imaging microsecond-level emission from upconverting nanoparticles (UCNPs).

Single-shot compressed temporal imaging is a computational imaging method that enables 2D lifetime mapping in one acquisition. In the conventional operation of the streak camera, the entrance slit limits the imaging field of view (FOV) to 1D. To lift this limitation, compressed-sensing paradigms have been implemented with optoelectronic streak cameras. The resulted compressed ultrafast photography (CUP) technique allows complete opening of the entrance slit for 2D ultrafast imaging in a single shot. CUP and its variants have been applied to single-shot fluorescence lifetime imaging. In contrast, single-shot compressed temporal imaging has not yet been applied to 2D imaging of microsecond-to-millisecond scale lifetimes, like those of upconverting nanoparticle (UCNP) emission. Single-shot photoluminescence lifetime imaging thermometry (SPLIT) system thus marks the first technique in this category. It is also the first demonstration of single-shot photoluminescence lifetime-based temperature mapping in a 2D field of view (FOV). Compared to conventional line-scanning counterpart, single-shot photoluminescence lifetime imaging thermometry (SPLIT) has considerable advantages in light throughput and sample choices.

To experimentally demonstrate the advantages of single-shot photoluminescence lifetime imaging thermometry (SPLIT) to line-scanning imaging, a moving photoluminescent sample was imaged (FIG. 17). In particular, the upconverting nanoparticles (UCNPs) with the shell thickness of 5.6 nm were covered by transparency of letter "A". This sample was loaded onto a translation stage. The sample moved along the y axis at a speed of 0.8 mm/s. To perform line scanning, a 150-μm-wide slit was placed at the intermediate image plane (FIG. 17A). Attached to a translation stage, the slit was scanned in the x direction across the field of view (FOV), which generated seven lifetime maps (FIG. 17B). After stitching these results together, a wide-field lifetime map is obtained as shown in (FIG. 17C). However, the stitched result inevitably suffers from a severe distortion effect due to the movement of the sample, which proves the incapability of line-scanning-based techniques in measuring dynamic photoluminescent objects. As a comparison, single-shot photoluminescence lifetime imaging thermometry (SPLIT) was used to image this sample under the same experimental conditions. Because of its single-shot imaging ability, single-shot photoluminescence lifetime imaging thermometry (SPLIT) produced seven 2D lifetime maps (FIG. 17D). No image produced by the single-shot photoluminescence lifetime imaging thermometry (SPLIT) system has such distortion. The results also clearly illustrate the movement of the letter "A". Therefore, single-shot photoluminescence lifetime imaging thermometry (SPLIT) has unique advantages over the conventional scanning-based lifetime measurement in data throughput, measurement accuracy, and application scope.

From the perspective of optical instrumentation, the single-shot photoluminescence lifetime imaging thermometry (SPLIT) system provides high-sensitivity cameras with ultrahigh imaging speeds in 2D field of view (FOV). In this regard, besides the single-shot wide-field photoluminescent lifetime mapping demonstrated in this disclosure the single-shot photoluminescence lifetime imaging thermometry (SPLIT) provides a generic imaging platform for many other studies. Potential future applications include optical voltage imaging of action potentials in neurons and high-throughput flow cytometry.

Figure 18C:
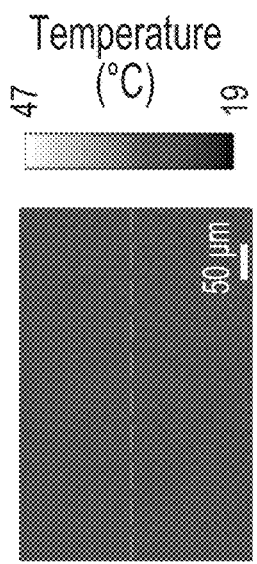
FIG. 18C shows a temperature image captured by using the thermal imaging camera.
Figure 18E:
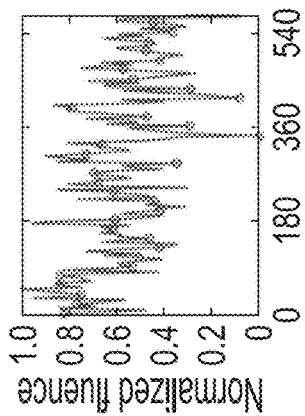
Figure 18D:
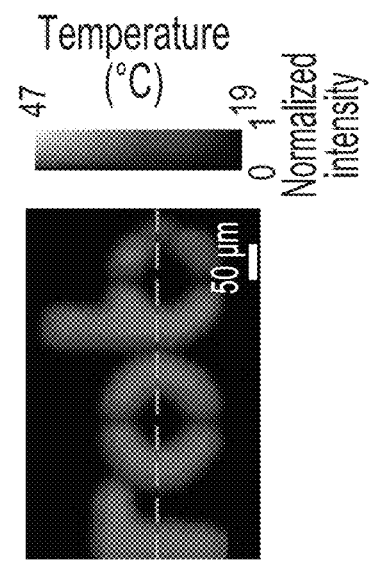
FIG. 18D shows as FIG. 18C using single-shot photoluminescence lifetime imaging thermometry (SPLIT)
Figure 18F:
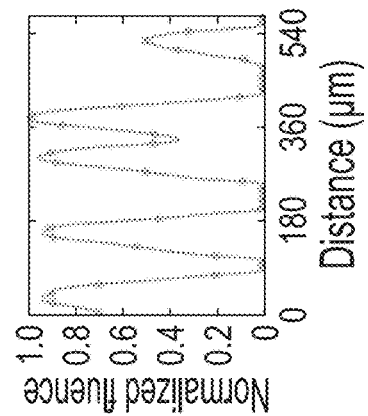
Figure 18A:
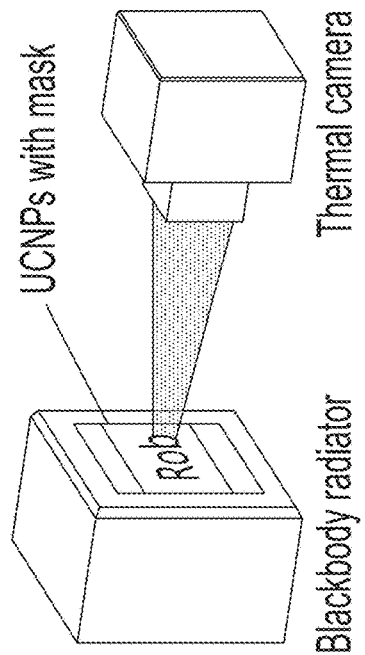
FIGS. 18A- and 18B show experimental system using thermal imaging camera (FIG. 18A) or photoluminescence lifetime imaging thermometry system (FIG. 18B), the sample and mask being heated up by a blackbody radiator.
Figure 18B:
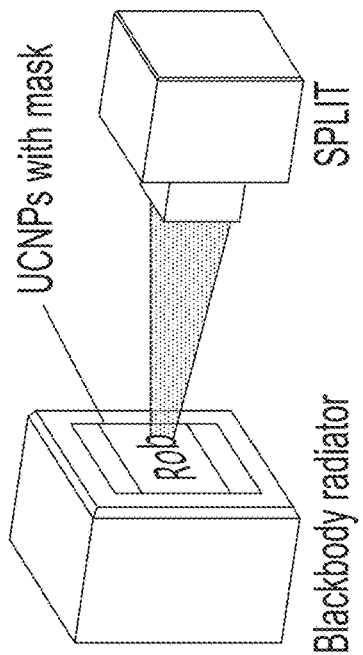

Supplementary Note 13: in a comparison test between single-shot photoluminescence lifetime imaging thermometry (SPLIT) and thermal imaging, a thermal imaging camera (Yoseen, X384D) (FIG. 18A) and single-shot photoluminescence lifetime imaging thermometry (SPLIT) (FIG. 18B) were used to image upconverting nanoparticles (UCNPs) covered by a metal mask of letters "rob" (Ted Pella, 460-2031-S). Akin to the single-shot photoluminescence lifetime imaging thermometry (SPLIT) system, a 4× magnification ratio was used for the thermal imaging camera. A blackbody radiator (Yoseen, YSHT-35) was used to heat this sample to 27° C. The images produced by these two methods are shown in FIGS. 18C, 18D and the selected line profiles are shown in FIGS. 18E, 18F. The edge contrast of the imaged letters using the thermal imaging camera is lower than that when using SPLIT. Moreover, the thermal imaging result presents strong background due to the same temperature of the mask, whereas single-shot photoluminescence lifetime imaging thermometry (SPLIT) keeps a clean background thanks to its optical sensing.

Figure 18I:
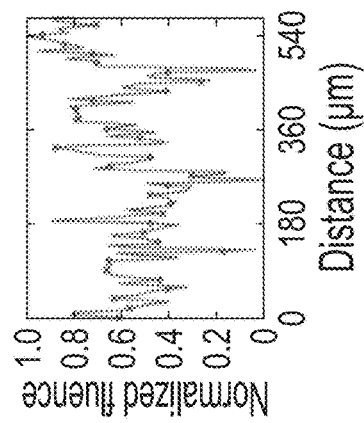
FIG. 18I shows as elected line profile from FIG. 18H.
Figure 18H:
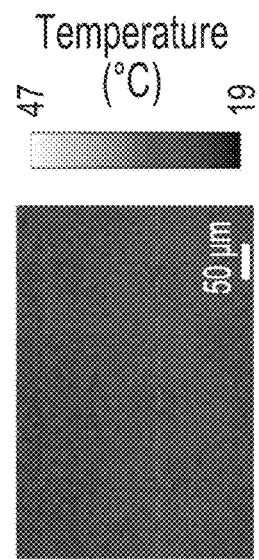
FIG. 18H shows a temperature image captured by the system in FIG. 18.
Figure 18G:
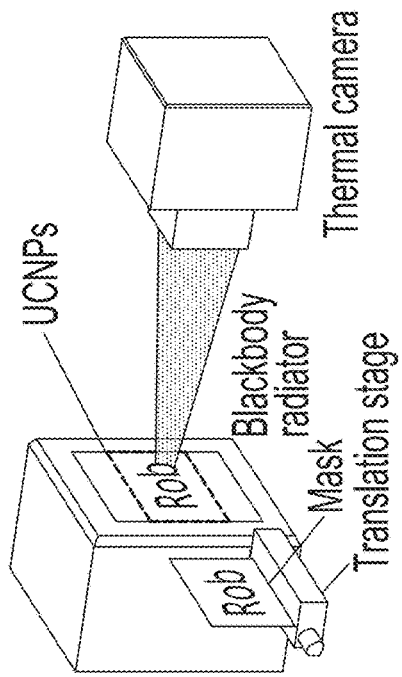
FIG. 18G shows same as FIG. 18A using a translation stage to move the mask with the room temperature.

In another experiment, the metal mask was loaded on a translation stage. The mask was kept out of the field of view (FOV) to keep its temperature at the room temperature in the laboratory. The upconverting nanoparticles (UCNPs) were still heated up by the blackbody radiator to 27° C. The mask was quickly moved into the field of view (FOV), and the thermal imaging camera captured the images immediately (FIG. 18F). The thermal image and the selected line profiles are shown in FIGS. 18H, 18I. Despite the slight improvement in contrast compared to FIGS. 18C, 18E, the image quality is still incomparable to the results produced by the single-shot photoluminescence lifetime imaging thermometry (SPLIT) (FIGS. 18D, 18F). Thus, compared to a thermal imaging camera, single-shot photoluminescence lifetime imaging thermometry (SPLIT) supplies increased. Table 1 below shows a comparison of different 2D lifetime imaging modalities using streak cameras, where: 1D, one-dimensional; CUP, compressed ultrafast photography; CUSP, compressed ultrafast spectral photography; FLIM, fluorescence lifetime imaging; LLE, lossless-encoding; PpLIM, phosphorescence lifetime imaging microscopy; "N/A" indicates that specific values cannot be found in the references.

TABLE 1

| | CUP [21] | LLE-CUP [22] | CUSP [24] | Sequential 1D ultrafast photography [19] | Sequential 1D ultrahigh-speed photography [20] | SPLIT |
|---|---|---|---|---|---|---|
| Application | Macroscopic FLI | High-speed Film [23] | Spectrally resolved FILM | FILM [25] | PpLIM | Video-rate PLI thermometry |
| Imaging scheme | Compressed streak imaging | Compressed streak imaging | Compressed streak imaging | Line-scanning | Line-scanning | Compressed streak imaging |
| Single-shot 2D mapping | Yes | Yes | Yes | No | No | Yes |
| Throughput | High | High | High | Low | Low | High |
| Inter-frame interval | 10 ps | 10-20 ps | 2 ps | 50 ps | 5.8 ns-4.7 μs | 30-250 μs |
| Recording time window | 3.5 ns | 3.5 ns-20 ns | 0.8 ns | 1-10 μs | 52 ns-5 ms | 3.0 ms |
| Spatial resolution | 1.67 mm | ≥0.2 μm | N/A | N/A | 1 μm | 20 μm |
| Applicability to dynamic samples | Yes | Yes | Yes | No | No | Yes |
| Type of streak camera | Optoelectronic | Optoelectronic | Optoelectronic | Optoelectronic | Mechanical | Mechanical |

TABLE 1-continued

|  | CUP [21] | LLE-CUP [22] | CUSP [24] | Sequential 1D ultrafast photography [19] | Sequential 1D ultrahigh-speed photography [20] | SPLIT |
|---|---|---|---|---|---|---|
| Cost | High | High | High | High | Low | Low |
| Size | Big | Big | Big | Big | Small | Small |
| Quantum efficiency (QE) | Moderate | Moderate | Moderate | Moderate | High | High |
| Power consumption | High | High | High | High | Low | Low |

The present optical temperature mapping method synergistically combines dual-view optical streak imaging with compressed sensing, to record wide-field luminescence decay of $Er^{3\pm}$, $Yb^{3\pm}$ co-doped $NaGdF_4$ upconverting nanoparticles in real time, from which a lifetime-based 2D temperature map is obtained in a single exposure. The method enables high-resolution longitudinal temperature monitoring beneath a thin scattering medium and dynamic temperature tracking of a moving biological sample at single-cell resolution.

Thus a method according to an aspect of the present disclosure comprises producing wide-field illumination to upconverting nanoparticles at the object plane, by expanding the laser beam diameter, using a 4f system or an optical beam expander for example. The near-infrared excited upconverting nanoparticles emit upconverted phosphorescence light in the visible spectrum. The decay of the emitted light intensity over the 2D field of view is a dynamic scene I(x,y,t). The emitted light is collected and equally divided into a reflected component and a transmitted component. The method then comprises imaging the reflected component (View 1) by spatiotemporal integration using a CMOS camera, a CCD camera, a sCMOS camera, or a EMCCD camera for example, and imaging the transmitted component (View 2) by spatial encoding using a printed mask or a spatial light modulator such as a digital micro-mirror device, or a printed mask loaded on a translation stage, temporal shearing, using a rotating mirror such as a galvanometer scanner, a polygonal scanner or a resonant scanner for example, and spatiotemporal integration, using a highly sensitive cameras such as an EMCCD or a global shutter sCMOS for example. The data of the images are processed for denoising, cropping, and calibration of the obtained two views, and video reconstruction or compressed sensing based video reconstruction is performed.

In the present single-shot phosphorescence lifetime imaging thermometry method, high parallelism in the data acquisition improves the overall light throughput. The method, comprising single-shot temperature sensing over a 2D field of view, allows improved measurement accuracy by avoiding scanning motion artifacts and laser intensity fluctuation. The present single-shot phosphorescence lifetime imaging thermometry method and system extend the application scope of phosphorescence lifetime imaging to observing non-repeatable temperature dynamics. They allow high tunability of imaging speeds, which accommodates a variety of upconverting nanoparticles with a wide lifetime span.

From the perspective of system design, both the dual-view data acquisition and the PnP-ADMM algorithm support high imaging quality in the present single-shot phosphorescence lifetime imaging thermometry system and method. In particular, View 1 preserves the spatial information in the dynamic scene. Meanwhile, View 2 retains temporal information by optical streaking via time-to-space conversion. Altogether, both views maximally keep rich spatiotemporal information. In software, the dual-view PnP-ADMM algorithm provides a powerful modular structure, which allows separated optimization of individual sub-optimization problem with an advanced denoising algorithm to generate high-quality image restoration results.

The present single-shot phosphorescence lifetime imaging thermometry method and system provide a versatile temperature-sensing platform. In materials characterization, they may be used in the stress analysis of metal fatigue in turbine blades. In biomedicine, they may be implemented for accurate sub-cutaneous temperature monitoring for theranostics of skin diseases such as melanoma. The microscopic temperature mapping ability may also be exploited for the studies of temperature-regulated cellular signaling. Finally, the operation of the method and system may be extended to Stokes emission in rare-earth nanoparticles and spectrally resolved temperature mapping.

The scope of the claims should not be limited by the embodiments set forth in the examples, but should be given the broadest interpretation consistent with the description as a whole.

The invention claimed is:

1. A method for real-time wide-field dynamic temperature sensing of an object, comprising producing wide-field illumination to upconverting nanoparticles at the object plane, collecting a light emitted by the upconverting nanoparticles, dividing a collected light into a reflected component and a transmitted component; imaging the reflected component into a first image, imaging the transmitted component into a second image; processing the images; reconstruction datacubes of the object from resulting processed images; and converting the reconstructed datacube to photoluminescence lifetime maps and temperature distributions, wherein said imaging the transmitted component comprises spatial encoding the object into spatially encoded frames using one of: a printed mask and a static mask displayed by a spatial light modulator, the method comprising temporally shearing the spatially encoded frames using a rotating mirror, and spatiotemporal integration of resulting spatially encoded and temporally sheared object into the second image.

2. The method of claim 1, wherein said imaging the reflected component comprises spatiotemporal integration.

3. The method of claim 1, wherein said imaging the reflected component comprises spatiotemporal integration using one of: a complementary metal oxide semiconductor (CMOS) camera, a charge-coupled device (CCD) camera, a scientific complementary metal oxide semiconductor (sCMOS) camera, and an electron-multiplying charged-coupled device (EMCCD) camera.

4. The method of claim 1, wherein said imaging the transmitted component comprises encoding the object into spatially encoded frames; the method comprising temporally shearing the spatially encoded frames, and spatiotemporal integration of resulting spatially encoded and temporally sheared object into the second image.

5. The method of claim 1, wherein said imaging the transmitted component comprises spatial encoding the object into spatially encoded frames using a binary mask, the method comprising temporally shearing the spatially encoded frames using a rotating mirror, and spatiotemporal integration of resulting spatially encoded and temporally sheared object into the second image.

6. The method of claim 1, wherein said imaging the transmitted component comprises spatial encoding the object into spatially encoded frames using a binary mask; the method comprising temporally shearing the spatially encoded frames using one of: a scanner, a polygonal scanner and a resonant scanner; and spatiotemporal integration of resulting spatially encoded and temporally sheared object into the second image using a highly sensitive camera.

7. The method of claim 1, wherein said imaging the transmitted component comprises spatial encoding the object into spatially encoded frames using a binary mask; the method comprising temporally shearing the spatially encoded frames using one of: a galvanometer scanner, a polygonal scanner and a resonant scanner; and spatiotemporal integration of resulting spatially encoded and temporally sheared object into the second image using one of: an electron-multiplying charged-coupled device (EMCCD) and a global shutter scientific complementary metal oxide semiconductor (sCMOS).

8. The method of claim 1, wherein said processing the images comprises at least one of: denoising, cropping, and calibration of the images.

9. The method of claim 1, wherein said reconstruction comprises one of: video reconstruction and compressed sensing based video reconstruction.

10. A system for real-time wide-field dynamic temperature sensing of an object, comprising:
   an illumination unit configured to produce wide-field illumination to upconverting nanoparticles at the object plane;
   an objective collecting light emitted by the upconverting nanoparticles;
   a beam splitter dividing a collected light into a reflected component and a transmitted component;
   a spatiotemporal integrator imaging the reflected component into a first image;
   a spatial encoder encoding the object into spatially encoded frames, a rotating mirror temporally shearing resulting spatially encoded, and a camera spatiotemporally integrating a resulting spatially encoded and temporally sheared object into a second image; and
   a processing unit reconstructing the object from the first and the second images,
   wherein the system is described in a forward model as: E=TM I(x,y,t) (1), where E is a concatenation of measurements $[E_1, \alpha E_2]^T$, M is a linear operator $[1, \alpha SC]^T$, and $\alpha$ is a scalar factor that balances an energy ratio between the two images during measurements; after data acquisition, E is used to retrieve a datacube of the object by leveraging a spatiotemporal sparsity of the object and prior knowledge of each operator;
   wherein, based on a plug-and-play alternating direction method of multipliers (PnP-ADMM), for reconstruction of the datacube, the processing unit solves a minimization problem as follows $$\hat{I} = \underset{I}{\operatorname{argmin}}\left\{\frac{1}{2}\|TMI - E\|_2^2 + R(I) + I_+(I)\right\}$$

where $\|\cdot\|_2^2$ represents a $l_2$ norm, $$\frac{1}{2}\|TMI - E\|_2^2$$

is a fidelity term representing a similarity between measurements and an estimated result, $R(\cdot)$ is an implicit regularizer that promotes sparsity in the object, $I_+(\cdot)$ represents a non-negative intensity constraint;
   wherein, for each (x,y) point, an area under a normalized intensity decay curve is integrated to obtain a photoluminescence lifetime value and a photoluminescence lifetime map from the reconstructed datacube; and
   wherein the system generates lifetime-determined temperature maps using a temperature distribution, T(x,y) obtained as follows:

$$T(x, y) = c_t + \frac{1}{S_a}\int \frac{\hat{I}(x, y, t)}{\hat{I}(x, y, 0)} dt$$

where $c_t$ is a constant, and $S_a$ is an absolute temperature sensitivity.

11. The system of claim 10, wherein said spatiotemporal integrator is one of: a complementary metal oxide semiconductor (CMOS) camera, a charge-coupled device (CCD) camera, a scientific complementary metal oxide semiconductor (sCMOS) camera, and an electron-multiplying charged-coupled device (EMCCD) camera.

12. The system of claim 10, wherein said spatial encoder is a binary mask.

13. The system of claim 10, wherein said spatial encoder is one of: a transmissive encoding mask with a pseudo-random binary pattern, a spatial light modulator, and a printed mask loaded on a translation stage.

14. The system of claim 10, wherein said camera is one of: an electron-multiplying charged-coupled device (EMCCD) camera and a global shutter scientific complementary metal oxide semiconductor (sCMOS) camera.

15. The system of claim 10, wherein said rotating mirror is one of: a galvanometer, a polygonal scanner and a resonant scanner.

16. The system of claim 10, wherein said illumination unit comprises one of a 980-nm continuous-wave laser and a 980-mm pulse laser, and an expander expanding a diameter of a laser beam from the laser.

17. The system of claim 10, wherein said spatial encoder is a pseudo-random binary mask, for a passive detection mode.

18. The system of claim 10, wherein said illumination unit comprises a laser source emitting a laser beam and an expander expanding a diameter of the laser beam to produces wide-field illumination.

* * * * *